United States Patent
Patil et al.

(10) Patent No.: US 10,129,930 B2
(45) Date of Patent: Nov. 13, 2018

(54) MULTIPLE BASIC SERVICE SET IDENTIFIER (BSSID) INDICATION

(71) Applicant: QUALCOMM Incorporated, San Diego, CA (US)

(72) Inventors: Abhishek Pramod Patil, San Diego, CA (US); George Cherian, San Diego, CA (US); Jouni Malinen, Tuusula (FI); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/695,975

(22) Filed: Sep. 5, 2017

(65) Prior Publication Data

US 2018/0098378 A1    Apr. 5, 2018

Related U.S. Application Data

(60) Provisional application No. 62/403,507, filed on Oct. 3, 2016, provisional application No. 62/411,530, filed on Oct. 21, 2016.

(51) Int. Cl.
*H04W 88/06* (2009.01)
*H04W 88/10* (2009.01)
(Continued)

(52) U.S. Cl.
CPC .......... *H04W 88/10* (2013.01); *H04W 48/12* (2013.01); *H04W 88/06* (2013.01); *H04W 16/06* (2013.01); *H04W 48/16* (2013.01); *H04W 84/12* (2013.01)

(58) Field of Classification Search
CPC .............................. H04W 88/10; H04W 88/06
See application file for complete search history.

(56) References Cited

U.S. PATENT DOCUMENTS

| | | |
|---|---|---|
| 2015/0373639 A1 | 12/2015 | Zhou et al. |
| 2016/0366637 A1 | 12/2016 | Barriac et al. |
| 2017/0086251 A1* | 3/2017 | Valliappan .......... H04W 76/048 |

FOREIGN PATENT DOCUMENTS

| | | | |
|---|---|---|---|
| KR | 20150124389 A | * | 11/2015 |
| KR | 20150124389 A | | 11/2015 |

OTHER PUBLICATIONS

Robert Statecy, May 2016, Specification Framework for TGax, IEEE P802.11, p. 1-61.*

(Continued)

*Primary Examiner* — Lakeram Jangbahadur
(74) *Attorney, Agent, or Firm* — Paradice and Li LLP/Qualcomm

(57) ABSTRACT

This disclosure provides systems, methods and apparatuses for enabling Multiple BSSID functionality. In some implementations, each BSS of the multi-BSS AP may transmit management frames with a Multiple BSSID element (MBE). Multiple BSSID-capable STAs may interpret the MBE information and implement corresponding Multiple BSSID functionality, whereas legacy STAs may ignore the MBE and interpret such frames as legacy management frames. In some other implementations, a multi-BSS AP may configure one or more of its BSSs to transmit management frames without the MBE. These legacy management frames may include a multi-BSS indicator (MBID) to advertise that the corresponding AP is a multi-BSS AP. The MBID also may provide information regarding a transmitted BSS of the multi-BSS AP. Multiple BSSID-capable STAs may search for a transmitted BSS based on the presence of the MBID, whereas legacy STAs may ignore the MBID and interpret such frames as legacy management frames.

30 Claims, 14 Drawing Sheets

(51) Int. Cl.
    *H04W 48/12*     (2009.01)
    *H04W 16/06*     (2009.01)
    *H04W 48/16*     (2009.01)
    *H04W 84/12*     (2009.01)

(56) References Cited

OTHER PUBLICATIONS

Hiertz, Aug. 2015, Multiple BSSID element, IEEE 802.11, p. 1-16.*
Chu L., et al., (Marvell): "BSS Color and Multiple BSSID; 11-16-0068-00-00ax-bss-Color-and-Multiple-bssid," IEEE Draft; 11-16-0068-00-00AX-BSS-Color-and-Multiple-BSSID, IEEE-SA Mentor, Piscataway, NJ USA, vol. 802.11ax, Jan. 18, 2016 (Jan. 18, 2016), 14 slides, XP068104839, [retrieved on Jan. 18, 2016].
Hiertz G.R., et al., (Ericsson): "Multiple BSSID element; 11-15-1014-00-00ax-multiple-bssid-element," IEEE Draft; 11-15-1014-00-00AX-MULTIPLE-BSSID-ELEMENT, IEEE-SA Mentor, Piscataway, NJ USA, vol. 802.11ax, Aug. 25, 2015 (Aug. 25, 2015), 16 slides, XP068098190, [retrieved on Aug. 25, 2015].
International Search Report and Written Opinion—PCT/US2017/050328—ISA/EPO—dated Nov. 29, 2017.
Stacey R., (Intel): "Spec Framework; 11-15-0132-17-00ax-spec-framework", IEEE Draft, May 26, 2016, vol. 802.11 ax, No. 17, XP068106633, pp. 1-61.

\* cited by examiner

| Element ID 510 | Length 520 | ... | MaxBSSID Indicator 530 |

| Element ID 610 | Length 620 | Element ID Ext. 630 | HE Operation Param. 640 | ... | MaxBSSID Indicator 650 |

| BSS Color 642 | ... | Multiple BSSID AP 644 | TX BSSID Indicator 646 |

MULTIPLE BASIC SERVICE SET IDENTIFIER (BSSID) INDICATION

CROSS-REFERENCE TO RELATED APPLICATIONS

This patent application claims priority to U.S. Provisional Patent Application No. 62/403,507 entitled "MULTIPLE BSSID INDICATION IN 11AX" filed on Oct. 3, 2016 and to U.S. Provisional Patent Application No. 62/411,530 entitled "MULTIPLE BASIC SERVICE SET IDENTIFIER (BSSID) INDICATION" filed on Oct. 21, 2016, all assigned to the assignee hereof. The disclosures of all prior applications are considered part of and are incorporated by reference in this patent application.

TECHNICAL FIELD

This disclosure relates generally to wireless networks, and specifically to identifying multiple Basic Service Sets (BSSs) in a Multiple BSSID network environment.

DESCRIPTION OF THE RELATED TECHNOLOGY

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. In a typical WLAN environment, a single (physical) AP acts as a single BSS. However, in some instances, an AP may support multiple "virtual" local area networks (VLANs). In such instances, a single AP may act as multiple BSSs (such that each BSS corresponds to a different "virtual" AP). Each BSS may be uniquely identified by a different BSS identifier (BSSID). Accordingly, different STAs may connect to different VLANs by associating with the corresponding BSS.

As described above, providing multiple VLANs through a single AP may be functionally equivalent to having multiple collocated APs. If each virtual AP were to broadcast its own beacons, or other management frames, a significant proportion of the medium access overhead will be consumed by the AP. Thus, to prevent the AP from monopolizing the wireless channel, the IEEE 802.11 specification defines a "Multiple BSSID" element (MBE) that may be used to manage communications with each of the multiple BSSs via a single management frame. For example, rather than transmit individual management frames on behalf of each of its associated BSSs, the AP may combine or aggregate BSS information (such as traffic indication map (TIM) information) for multiple BSSs in a single management frame.

Although the "Multiple BSSID" capability is defined by the IEEE 802.11 specification, many STAs (such as legacy devices) currently do not support its implementation. Thus, there is a need to implement Multiple BSSID functionality (such as by reducing the overhead of communications in multiple-VLAN environments) while ensuring compatibility and support for legacy devices.

SUMMARY

The systems, methods and devices of this disclosure each have several innovative aspects, no single one of which is solely responsible for the desirable attributes disclosed herein.

One innovative aspect of the subject matter of this disclosure can be implemented in a method of transmitting management information on behalf of multiple Basic Service Sets (BSSs) in a Multiple BSSID wireless system. The method may include steps of generating a first management frame for a first basic service set (BSS), the first management frame including aggregated management information for establishing or maintaining communications with at least one BSS other than the first BSS; generating a second management frame for a second BSS, the second management frame including non-aggregated management information for establishing or maintaining communications with only the second BSS; transmitting the first management frame, from an access point (AP), on behalf of the first BSS; and transmitting the second management frame, from the AP, on behalf of the second BSS.

In some implementations, the MBID may advertise the AP as a multi-BSS AP. For example, the MBID may correspond to at least one of a single bit value, a BSS identifier (BSSID) of the first BSS, or timing information indicating a time at which the first management frame is scheduled to be transmitted. In some other implementations, the MBID may include address information for deriving the address of the first BSS. For example, the address information may include a number (N) of least significant bits (LSBs) in which the address of the first BSS differs from the address of the second BSS. The address information may further include the bit values for the LSBs of the first BSS. Still further, in some implementations, communication frames transmitted on behalf of each of the first BSS and the second BSS may be associated with the same BSS color.

In some implementations, the first BSS may be configured to operate according to the IEEE 802.11ax specification. Thus, the aggregated management information may be provided in a Multiple BSSID element (MBE) of the first management frame. In some other implementations, the second management frame may not include an MBE. Thus, management or control frames transmitted on behalf of the first BSS may provide scheduled access to wireless stations (STAs) associated with the first BSS or the at least one BSS other than the first BSS. On the other hand, management or control frames transmitted on behalf of the second BSS may provide access to STAs associated with the second BSS, including STAs that do not support receiving control frames from the first BSS.

In some implementations, the method may further include steps of transmitting a control frame, from the AP, on behalf of the first BSS, wherein the control frame is directed to STAs associated with the first BSS or the at least one BSS other than the first BSS; receiving a response frame, from at least one of the STAs, in response to the control frame; and decoding whether the response frame is intended for the first BSS or the at least one BSS other than the first BSS.

Another innovative aspect of the subject matter described in this disclosure can be implemented in an access point (AP). The AP includes one or more processors and a memory storing instructions that, when executed by the one or more processors, cause the AP to generate a first management frame for a first BSS, the first management frame including aggregated management information for establishing or maintaining communications with a at least one BSS other than the first BSS; generate a second management frame for a second BSS, the second management frame including non-aggregated management information for establishing or maintaining communications with only the second BSS; transmit the first management frame on behalf of the first BSS; and transmit the second management frame on behalf of the second BSS.

In some implementations, the MBID may advertise the AP as a multi-BSS AP. For example, the MBID may correspond to at least one of a single bit value, a BSSID of the first BSS, or timing information indicating a time at which the first management frame is scheduled to be transmitted. In some other implementations, the MBID may include address information for deriving the address of the first BSS. For example, the address information may include a number N of LSBs in which the address of the first BSS differs from the address of the second BSS. The address information may further include the bit values for the LSBs of the first BSS. Still further, in some implementations, communication frames transmitted on behalf of each of the first BSS and the second BSS may be associated with the same BSS color.

In some implementations, the first BSS may be configured to operate according to the IEEE 802.11ax specification. Thus, the aggregated management information may be provided in an MBE of the first management frame. In some other implementations, the second management frame may not include an MBE. Thus, management or control frames transmitted on behalf of the first BSS may provide scheduled access to STAs associated with the first BSS or the at least one BSS other than the first BSS. On the other hand, management or control frames transmitted on behalf of the second BSS may provide access to STAs associated with the second BSS and STAs that do not support receiving control frames from the first BSS.

In some implementations, execution of the instructions may further cause the AP to transmit a control frame on behalf of the first BSS, wherein the control frame is directed to STAs associated with the first BSS or the at least one BSS other than the first BSS; receive a response frame, from at least one of the STAs, in response to the control frame; and decode whether the response frame is intended for the first BSS or the at least one BSS other than the first BSS.

Another innovative aspect of the subject matter described in this disclosure can be implemented in a method of identifying and communicating with a transmitted BSS in a Multiple BSSID wireless system. The method may include steps of receiving a first management frame, from an AP, on behalf of a first BSS; identifying a second management frame, transmitted by the AP, based at least in part on an MBID provided in the first management frame, wherein the second management frame includes aggregated management information for establishing or maintaining communications with at least one BSS other than the second BSS; and communicating with the second BSS or the at least one BSS using the aggregated management information.

In some implementations, the MBID may advertise the AP as a multi-BSS AP. For example, the MBID may correspond to at least one of a single bit value, a BSSID of the second BSS, or timing information indicating a time at which the first management frame is scheduled to be transmitted. In some other implementations, the MBID may include address information for deriving the address of the second BSS. For example, the address information may include a number N of LSBs in which the address of the first BSS differs from the address of the second BSS. The address information may further include the bit values for the LSBs of the second BSS.

In some implementations, the step of identifying the second management frame may further include steps of determining a BSS color associated with the first management frame, and searching for management frames transmitted by the second BSS based on the BSS color associated with the first management frame. For example, the first management frame and the second management frame may be associated with the same BSS color.

In some implementations, the second BSS may be configured to operate according to the IEEE 802.11ax specification. Thus, the aggregated management information may be provided in an MBE of the second management frame. In some other implementations, the first management frame does not include an MBE.

In some implementations, the step of communicating with the second BSS or the at least one BSS may further include steps of associating with the at least one BSS other than the second BSS and, while associated with the at least one BSS, listening for management or control frames, transmitted by the AP, on behalf of the at least one BSS, and listening for management or control frames, transmitted by the AP, on behalf of the second BSS.

In some implementations, the method may further include a step of transmitting a first communication frame to the AP. The first communication frame may indicate a capability to decode management or control frames transmitted on behalf of the second BSS while associated with the at least one BSS other than the second BSS.

Another innovative aspect of the subject matter described in this disclosure can be implemented in a wireless station (STA). The STA includes one or more processors and a memory storing instructions that, when executed by the one or more processors, cause the STA to receive a first management frame, from an AP, on behalf of a first BSS; identify a second management frame, transmitted by the AP, based at least in part on an MBID provided in the first management frame, wherein the second management frame includes aggregated management information for establishing or maintaining communications with at least one BSS other than the second BSS; and communicate with the second BSS or the at least one additional BSS using the aggregated management information.

In some implementations, the MBID may advertise the AP as a multi-BSS AP. For example, the MBID may correspond to at least one of a single bit value, a BSSID of the second BSS, or timing information indicating a time at which the first management frame is scheduled to be transmitted. In some other implementations, the MBID may include address information for deriving the address of the second BSS. For example, the address information may include a number N of LSBs in which the address of the first BSS differs from the address of the second BSS. The address information may further include the bit values for the LSBs of the second BSS.

In some implementations, execution of the instructions for identifying the second management frame may further cause the STA to determine a BSS color associated with the first management frame, and search for management frames transmitted by the second BSS based on the BSS color associated with the first management frame. For example, the first management frame and the second management frame may be associated with the same BSS color.

In some implementations, the second BSS may be configured to operate according to the IEEE 802.11ax specification. Thus, the aggregated management information may be provided in an MBE of the second management frame. In some other implementations, the first management frame does not include an MBE.

In some implementations, execution of the instructions for communicating with the second BSS or the at least one additional BSS may further cause the STA to associate with the at least one BSS other than the second BSS and, while associated with the at least one BSS, listen for management or control frames, transmitted by the AP, on behalf of the at least on BSS, and listen for management or control frames, transmitted by the AP, on behalf of the second BSS.

In some implementations, execution of the instructions may further cause the STA to transmit a first communication frame to the AP. The first communication frame may indicate a capability to decode management or control frames transmitted on behalf of the second BSS while the STA is associated with the at least one BSS other than the second BSS.

Details of one or more implementations of the subject matter described in this disclosure are set forth in the accompanying drawings and the description herein. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
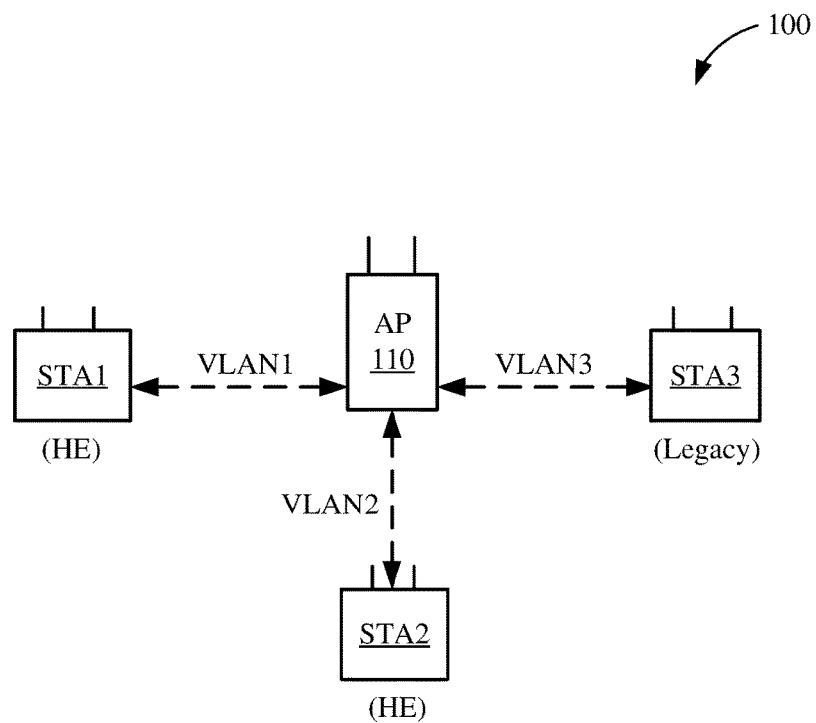
FIG. 1 shows a block diagram of an example wireless system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The IEEE 802.11 specification defines a Multiple BSSID capability. However, many legacy STAs are not configured to support Multiple BSSIDs. As a result, many APs continue to implement legacy management frames (such that a separate beacon or other management frame is transmitted for each BSS). This may result in an inefficient allocation of available resources (such as disproportionate channel access time by the AP). Furthermore, the IEEE 802.11ax specification enables an AP to schedule access to the wireless medium (by each of the STAs) using control frames (such as trigger frames, multi-STA block acknowledgement frames, null data packet announcement (NDPA) frames, etc.). The IEEE 802.11ax specification extends Multiple BSSID support to control frames, for example, to enable the AP to schedule channel access for STAs associated with different BSSs. For example, a broadcast target wake time (TWT) element carried in a management frame can indicate a wake-up schedule for one or more STAs, while a control frame (such as a Trigger frame) can elicit Trigger-based (uplink) response frames from one or more STAs. Thus, it may be desirable to provide scheduled access to capable STAs, while also ensuring support for legacy devices.

Some implementations described herein may enable a multi-BSS AP to serve legacy STAs as well as STAs that support Multiple BSSID functionality. For example, in some implementations, each BSS of the multi-BSS AP may transmit beacon (and other management or control) frames with a Multiple BSSID element (MBE). Upon receiving such management frames, Multiple BSSID-capable STAs may interpret the MBE information and implement corresponding Multiple BSSID functionality (including per-BSS scheduled access), whereas legacy STAs may ignore the MBE and interpret such beacons as legacy beacon frames. In some other implementations, a multi-BSS AP may designate one (or more) of the BSSs to transmit beacon (and other management or control) frames with an MBE, whereas at least one of the remaining BSSs are configured to transmit beacon (and other management or control) frames without an MBE. These "legacy" beacon (and other management) frames may include a multi-BSS indicator (MBID) to advertise that the corresponding AP is a multi-BSS AP. In some aspects, the MBID also may provide information regarding a transmitted BSS of the multi-BSS AP. Upon receiving a legacy management frame, Multiple BSSID-capable STAs may interpret the MBID information to detect or otherwise listen for other management frames from the multi-BSS AP containing MBE information, whereas legacy STAs may ignore the MBID and interpret such beacons as legacy beacon frames.

Particular implementations of the subject matter described in this disclosure can be implemented to realize one or more of the following potential advantages. The performance of multi-BSS wireless networks while ensuring compatibility and support for legacy devices may be improved. For example, by providing MBE information in beacon frames broadcast by each BSS of a multi-BSS AP, the multi-BSS AP may ensure that Multiple BSSID-compatible STAs (such as HE STAs) are able to receive the MBE information while also ensuring that legacy STAs are able to receive legacy beacon information (for maintaining association with the corresponding BSS). Accordingly, HE STAs may take advantage of scheduled channel access schemes implemented by the multi-BSS AP, whereas legacy STAs may continue to communicate with the multi-BSS AP using legacy channel access schemes (such as carrier-sense multiple access (CSMA)). Further, by enabling one or more of the BSSs to broadcast beacons with MBE information and others to broadcast beacons with MBID information, the multi-BSS AP may further reduce the overhead (such as time and processing resources) used to convey MBE information to Multiple BSSID-compatible STAs (such as HE STAs).

In the following description, numerous specific details are set forth such as examples of specific components, circuits, and processes to provide a thorough understanding of the present disclosure. A "multi-BSS AP" refers to a physical access point or device configured to provide multiple Basic Service Sets (BSSs) or virtual local area networks (VLANs). The term "transmitted BSS" refers to any BSS of a multi-BSS AP that supports Multiple BSSID functionality and transmits management frames with MBE information; the term "non-transmitted BSS" refers to any BSS of a multi-BSS AP that supports Multiple BSSID functionality but does not transmit management frames with MBE information; and the term "legacy BSS" refers to any BSS of a multi-BSS AP that operates according to older IEEE 802.11 standards. The term "HE" may refer to a high efficiency frame format or protocol defined, for example, by the IEEE 802.11ax specification. Thus, the term "HE STA" may refer to STAs that operate according to the IEEE 802.11ax specification. The term "legacy STA" may refer to STAs that operate according to older IEEE 802.11 standards and may be unable to decode MBE information or implement Multiple BSSID functionality (such as parsing a traffic indication map (TIM) from a transmitted BSS). In addition, although described herein in terms of exchanging data frames between wireless devices, the implementations may be applied to the exchange of any data unit, packet, and/or frame between wireless devices. Thus, the term "frame" may include any frame, packet, or data unit such as, for example, protocol data units (PDUs), media access control (MAC) protocol data units (MPDUs), and physical layer convergence procedure protocol data units (PPDUs).

FIG. 1 shows a block diagram of an example wireless system. The wireless system 100 is shown to include an access point (AP) 110 and a number of wireless stations STA1-STA3. Although only three wireless stations STA1-STA3 are shown in the example of FIG. 1 for simplicity, it is to be understood that the wireless system 100 may include any number of STAs.

The wireless stations STA1-STA3 may include any suitable Wi-Fi enabled wireless device including, for example, a cell phone, personal digital assistant (PDA), tablet device, laptop computer, or the like. A STA also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some implementations, each of the wireless stations STA1-STA3 may include one or more transceivers, one or more processing resources (such as processors or ASICs), one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described below.

The AP 110 may be any suitable device that allows one or more wireless devices to connect to a network (such as a local area network (LAN), wide area network (WAN), metropolitan area network (MAN), or the Internet) using Wi-Fi, Bluetooth, or any other suitable wireless communication standards. For some implementations, the AP 110 may be any suitable wireless device (such as a wireless STA) acting as a software-enabled access point ("SoftAP"). For at least one implementation, the AP 110 may include one or more transceivers, one or more processing resources (such as processors or ASICs), one or more memory resources, and a power source. The memory resources may include a non-transitory computer-readable medium (such as one or more nonvolatile memory elements, such as EPROM, EEPROM, Flash memory, a hard drive, etc.) that stores instructions for performing operations described below.

The AP 110 may be a multi-BSS AP that is configured to provide multiple virtual local area networks VLAN1-VLAN3, for example, in accordance with the IEEE 802.11 family of standards (or according to other suitable wireless protocols). Each of the virtual local area networks VLAN1-VLAN3 may correspond to a respective BSS. Thus, the "physical" AP 110 may serve as (or otherwise provide the functionality of) multiple Basic Service Sets (BSSs) or "virtual" APs. In the example of FIG. 1, STA1 is connected to VLAN1, STA2 is connected to VLAN2, and STA3 is connected to VLAN3. Further, stations STA1 and STA2 may be HE STAs that support Multiple BSSID functionality, whereas STA3 may be a legacy STA that does not support Multiple BSSID functionality. Thus, STA3 may be unaware that the AP 110 is a multi-BSS AP.

In some implementations, the AP 110 may be configured to provide Multiple BSSID functionality to HE stations (such as STA1 and STA2) while also providing support for legacy devices (such as STA3). For example, in some aspects, the AP 110 may transmit or broadcast respective beacon (or other management) frames for each of the virtual local area networks VLAN1-VLAN3. More specifically, each beacon frame may include a Multiple BSSID element (MBE) that provides aggregated management information. The aggregated management information may be used to identify and associate with two or more of the virtual local area networks VLAN1-VLAN3. In some aspects, each beacon may further include aggregated traffic information (such as a traffic indication map (TIM)) for multiple BSSIDs. For example, the beacon may carry traffic information for the originating BSSID in addition to traffic information for one or more BSSIDs other than the originating BSSID. The HE stations STA1 and STA2 may detect and interpret the MBE information provided in each received beacon frame to implement the corresponding Multiple BSSID functionality, whereas the legacy station STA3 may ignore the MBE information and treat each received beacon as a legacy management frame.

In some other aspects, the AP 110 may provide the MBE in beacon (or other management) frames transmitted for VLAN1 or VLAN2 (or both). The AP 110 may further provide a multi-BSS indicator (MBID), which advertises the AP 110 as a multi-BSS AP, in beacon (or other management) frames transmitted for VLAN3. If any of the HE stations STA1 or STA2 receives a beacon frame associated with VLAN3, such HE STAs may detect and interpret the MBID information to listen for beacon (or control) frames from VLAN1 or VLAN2. If the legacy station STA3 receives a beacon frame associated with VLAN3, the STA may ignore the MBID information and treat the received beacon as a legacy management frame. Similarly, if the legacy station STA3 receives a beacon frame associated with VLAN1 or VLAN2, the legacy STA may ignore the MBE information and treat the received beacon as a legacy management frame.

Figure 2:
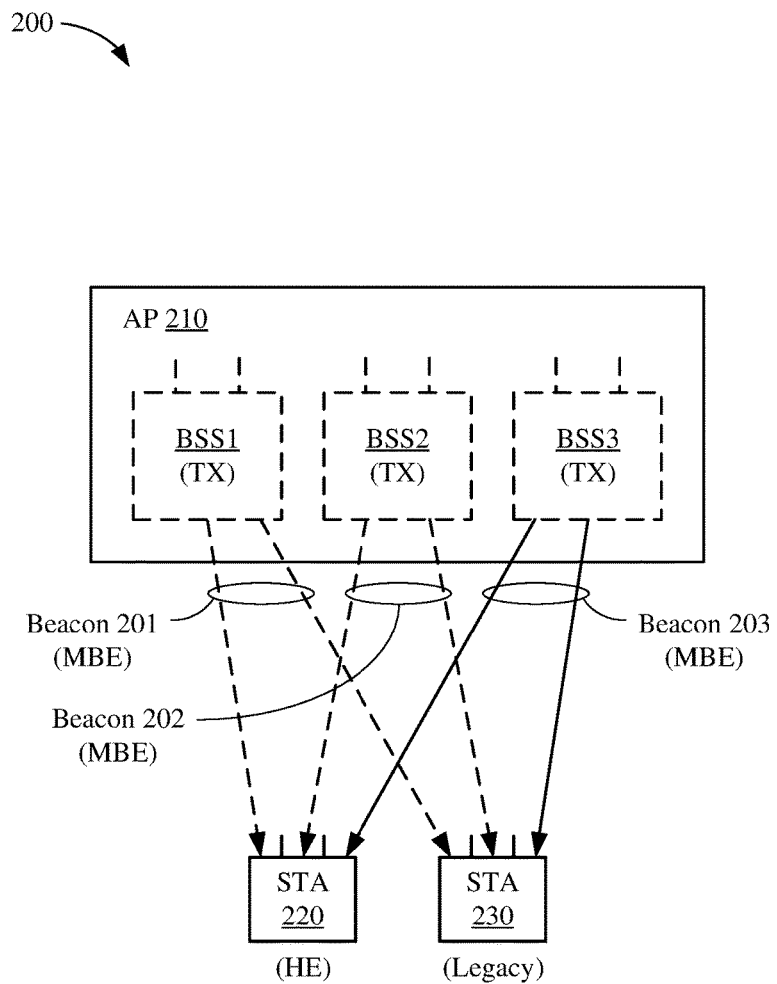
FIG. 2 shows an example Multiple BSSID wireless system with legacy support.

FIG. 2 shows an example Multiple BSSID wireless system 200 with legacy support. The system 200 includes an AP 210 and a number of STAs 220 and 230. In the example of FIG. 2, the AP 210 is a multi-BSS AP serving as three Basic Service Sets BSS1-BSS3 (or virtual APs). Each of the Basic Service Sets BSS1-BSS3 may correspond to a different VLAN (such as virtual local area networks VLAN1-VLAN3, respectively, of FIG. 1). Further, in the example of FIG. 2, STA 220 is an HE STA that supports Multiple BSSID functionality, whereas STA 230 is a legacy STA that does not support Multiple BSSID functionality.

Figure 5:
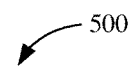
FIG. 5 shows an example Multiple BSSID element.

In some implementations, each of the Basic Service Sets BSS1-BSS3 may be a "transmitted" (TX) BSS. Accordingly, each of the Basic Service Sets BSS1-BSS3 may transmit beacon (or other management) frames 201-203, respectively, with MBE information. With reference for example to FIG. 5, a Multiple BSSID element 500 may include an "Element ID" field 510, a "Length" field 520, a "MaxBSSID Indicator" field 530, and one or more additional fields for optional sub-elements (not shown for simplicity). The Element ID field 510 may store 1 byte of information identifying the element 500 as a Multiple BSSID element. The Length field 520 may store 1 byte of information indicating the length of the Multiple BSSID element 500. The MaxBSSID Indicator field 530 may store up to 1 byte of information indicating the maximum number of transmitted BSSs (and non-transmitted BSSs) implicated by the Multiple BSSID element 500.

The HE STA 220 may receive beacons 201-203 from any of the Basic Service Sets BSS1-BSS3, respectively, and implement the Multiple BSSID functionality indicated in the MBE (including scheduling information). For example, each of the beacons 201-203 may include management information for establishing or maintaining communications with a respective one of the Basic Service Sets BSS1-BSS3 (referred to herein as "non-aggregated" management information), as well as aggregated management information (such as provided in the MBE) for establishing or maintaining communications with two or more of the Basic Service Sets BSS1-BSS3. Thus, after detecting the MBE information provided in the beacons 201-203, the HE STA 220 may further listen for control frames (and other management frames) that contain scheduling information from the corresponding BSS. The legacy STA 230 may receive beacons 201-203 from any of the Basic Service Sets BSS1-BSS3, respectively, and implement legacy management functionality (such as associating with, or maintaining a connection to, the corresponding BSS). For example, the legacy STA 230 may ignore the MBE information provided in the beacons 201-203, and may treat each beacon as a legacy beacon frame.

More specifically, the beacon 201 broadcast by BSS1 may include non-aggregated management information for establishing or maintaining communications with BSS1, and also may include aggregated management information for establishing or maintaining communications with at least one other BSS associated with the AP 210 (such as BSS2 or BSS3). The beacon 202 broadcast by BSS2 may include non-aggregated management information for establishing or maintaining communications with BSS2, and also may include aggregated management information for establishing or maintaining communications with at least one other BSS associated with the AP 210 (such as BSS1 or BSS3). The beacon 203 broadcast by BSS3 may include non-aggregated management information for establishing or maintaining communications with BSS3, and also may include aggregated management information for establishing or maintaining communications with at least one other BSS associated with the AP 210 (such as BSS1 or BSS2).

By configuring each of the Basic Service Sets BSS1-BSS3 to broadcast respective beacons containing MBE information, the AP 210 may provide scheduled access to HE STAs (such as STA 220) while also ensuring compatibility with legacy STAs (such as STA 230). Thus, any of the Basic Service Sets BSS1-BSS3 may service HE STAs and legacy STAs (as shown in FIG. 2, STAs 220 and 230 may each be associated with BSS3). However, because multi-BSS control frames can be sent by any of the Basic Service Sets BSS1-BSS3, HE STAs may be required to decode MBE information from each of the Basic Service Sets BSS1-BSS3. Furthermore, beacon (and other management) frames are typically sent at the lowest modulation and coding scheme (MCS). Thus, by configuring each of the Basic Service Sets BSS1-BSS3 to broadcast respective beacons 201-203, the AP 210 may monopolize a disproportionate share of the medium access time. Thus, it may be desirable to reduce the number beacons broadcast by the AP 210 and, more specifically, the number of transmitted BSSs in the multi-BSS AP 210.

Figure 3A:
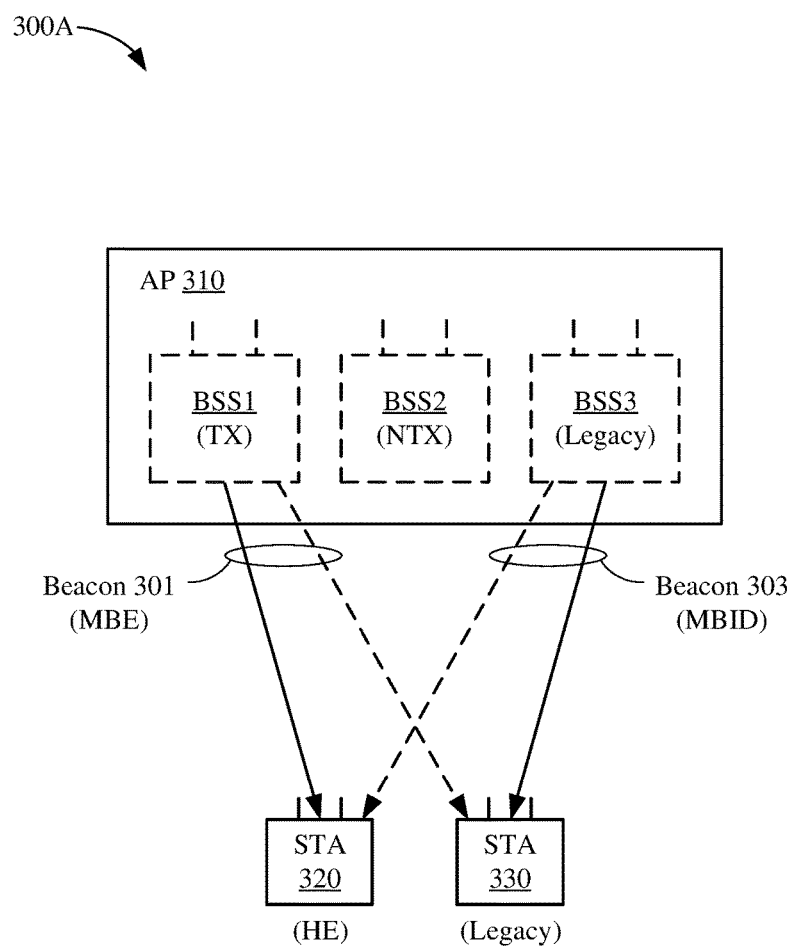
FIGS. 3A and 3B show example Multiple BSSID wireless systems with a single transmitted BSS.

FIG. 3A shows an example Multiple BSSID wireless system 300A with a single transmitted BSS. The system 300A includes an AP 310 and a number of STAs 320 and 330. In the example of FIG. 3A, the AP 310 is a multi-BSS AP serving as three Basic Service Sets BSS1-BSS3 (or virtual APs). Each of the Basic Service Sets BSS1-BSS3 may correspond to a different VLAN (such as virtual local area networks VLAN1-VLAN3, respectively, of FIG. 1). Further, in the example of FIG. 3A, STA 320 is an HE STA that supports Multiple BSSID functionality, whereas STA 330 is a legacy STA that does not support Multiple BSSID functionality.

In the example of FIG. 3A, BSS1 may be a transmitted (TX) BSS, BSS2 may be a non-transmitted (NTX) BSS, and BSS3 may be a legacy BSS. Accordingly, BSS1 may transmit beacon (or other management) frames 301 with MBE information. In some implementations, BSS2 does not transmit any beacon (or other management) frames. Thus, access to BSS2 may be managed through BSS1. More specifically, the MBE information provided in the beacons 301, broadcast by BSS1, may advertise BSSID information (such as an aggregated or combined TIM) for multiple Basic Service Sets BSS1 and BSS2. For example, the beacons 301 may include a Multiple BSSID element (such as the Multiple BSSID element 500 of FIG. 5). The HE STA 320 may receive the beacons 301 from BSS1 and implement the Multiple BSSID functionality indicated in the MBE (including a scheduled channel access scheme). More specifically, the HE STA 320 may use the MBE information to associate (or reassociate) with any of the Multiple BSSID-configured Basic Service Sets BSS1 or BSS2, and to receive multi-BSS management and control frames from a transmitted BSS (such as BSS1).

It is noted that, while the non-transmitted Basic Service Set BSS2 may not broadcast beacon frames, it may transmit control frames (such as acknowledgment (ACK) frames, request to send (RTS) frames, clear to send (CTS) frames, and the like) and other management frames (such as probe response frames, authentication frames, association frames, and the like). Thus, once associated with a non-transmitted BSS, an HE STA may subsequently receive control frames directly from the non-transmitted BSS. In some implementations, a STA may be configured to decode control frames from a BSS with which it is not associated. For example, if a STA is associated with a BSS other than a transmitted BSS, the STA may listen for and decode control frames from the transmitted BSS in addition to listening for and decoding control frames from its associated BSS (which may be a legacy BSS or a non-transmitted BSS). In some systems, the STA may indicate support for this capability via a field or a bit in an element (such as an HE Capabilities element) of one or more communication frames transmitted by the STA. For example, if the HE STA 320 is associated with BSS2, the HE STA 320 may then listen for control frames from BSS2 and from BSS1. Similarly, a multi-BSS AP also may be configured to decode response frames from a STA (in response to the control frame) to determine the particular BSS for which the response is intended. For example, the AP 310 may determine whether a response frame transmitted by the HE STA 320 (in response to a control frame transmitted on behalf of BSS1) is intended for BSS1 or BSS2.

In some implementations, the beacons 301 broadcast by BSS1 also may include non-aggregated management information for BSS1. Thus, in some aspects, the legacy STA 330 also may receive beacons 301 from BSS1 and implement legacy management functionality (such as associating with, or maintaining a connection to, BSS1). In some other implementations, the beacons 301 broadcast by BSS1 may not include any non-aggregated management information. For example, to prevent unscheduled access to BSS1 (and reduce overhead), the transmitted Basic Service Set BSS1 may broadcast its beacons 301 with aggregated management information only (thereby restricting access to HE STAs). Thus, in some other aspects, the legacy STA 330 may be unable to decode the beacons 301 broadcast by BSS1.

Still further, in some implementations, the aggregated management information provided in the beacons 301 may not include information for establishing or maintaining communications with BSS1. For example, in some aspects, a transmitted BSS (such as BSS1) may function only as a communications proxy for one or more non-transmitted BSSs (such as BSS2). In other words, BSS1 may transmit management and control information (such as beacon and probe response frames) to one or more STAs on behalf of BSS2. Thus, while the transmitter address (TA) of the management or control frame may specify BSS1, the information provided therein pertains only to BSS2 (or other BSSs represented by BSS1). However, no STAs may associate with BSS1. In some other implementations, only legacy STAs (or HE STAs implementing legacy communications) may associate with a transmitted BSS (using non-aggregated management information provided in the beacons 301), whereas HE STAs may use the aggregated information provided in the beacons 301 to associate with a non-transmitted BSS.

The legacy Basic Service Set BSS3 may transmit beacon (or other management) frames 303 without MBE information, for example, to provide support for legacy STAs (such as STA 330). For example, the beacons 303 may include non-aggregated management information for establishing or maintaining communications with BSS3 only. In some implementations, the beacons 303 may not contain aggregated management information. However, HE STAs also may be configured to interpret legacy management information. Thus, to prevent HE STAs (such as STA 320) from "locking on" to the legacy Basic Service Set BSS3 (which may result in an inefficient use of the STA's HE capabilities), the beacons 303 broadcast by BSS3 may include a multi-BSS indicator (MBID). The MBID may advertise or otherwise indicate (to HE STAs) that the AP 310 is a multi-BSS AP. The legacy STA 330 may ignore the MBID information provided in the beacons 301, and may treat such beacons as legacy beacon frames. However, the HE STA 320 may detect the MBID information in a received beacon (such as beacon 303), and may search for a transmitted BSS associated with the AP 310. Since a multi-BSS AP includes at least one transmitted BSS, the MBID also may indicate the presence of a transmitted BSS in a vicinity of the HE STA 320. Thus, the HE STA 320 may search for the transmitted BSS (such as BSS1) based at least in part on the MBID information.

Figure 6:
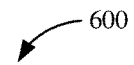
FIG. 6 shows an example HE Operation element.

In some implementations, the presence of MBID information (or lack of MBE information) in a received beacon frame may indicate, to an HE STA, that the originating BSS (such as BSS3) is not a transmitted BSS. In some other implementations, one or more of the beacons 301 and 303 may include a field (provided in an HE Operation element, HE Capabilities element, or a new information element or extended capabilities element) indicating whether the associated BSS (BSS1 or BSS3, respectively) is a transmitted BSS. With reference for example to FIG. 6, an HE Operation element 600 may include an "Element ID" field 610, a "Length" field 620, an "Element ID Extension" field 630, an "HE Operation Parameters" field 640, and one or more additional fields for optional sub-elements (not shown for simplicity). For example, the HE Operation element 600 may be provided in beacon and probe response frames transmitted by the AP 310. The Element ID field 610 may store 1 byte of information identifying the element 600 as an HE Operation element. The Length field 620 may store 1 byte of information indicating the length of the HE Operation element 600. The Element ID Extension field 630 may store an additional byte of information as an extension to the Element ID field 610.

The MaxBSSID Indicator field 650 may store up to 1 byte of information indicating the maximum number of transmitted BSSs and non-transmitted BSSs implicated by the HE Operation element 600. For example, a number (n) of bits may be used to indicate a number (up to $2^n$) of BSSs that are associated with a multi-BSS AP. It is noted that the MaxBSSID Indicator field 650 is similar, if not identical, to the MaxBSSID Indicator field 530 of the Multiple BSSID element 500. Moreover, a transmitted BSS may broadcast beacons that include the Multiple BSSID element 500 as well as the HE Operation element 600. Thus, in some implementations, beacons broadcast by a transmitted BSS may not include the MaxBSSID Indicator field 650 in its HE Operation element 600. Rather, upon receiving a beacon from a transmitted BSS, the recipient STA may determine the maximum number of transmitted BSSs and non-transmitted BSSs from the MaxBSSID Indicator field 530 provided in the Multiple BSSID element 500 of the same beacon frame.

The HE Operation Parameters field 640 may store up to 4 bytes of information indicating one or more HE operations or parameters supported by the AP or BSS associated with the HE Operation element 600. More specifically, the HE Operation Parameters field 640 may include a "Multiple BSSID AP" subfield 644 and a "TX BSSID Indicator" subfield 646. The Multiple BSSID AP subfield 644 may store 1 bit of data indicating whether the AP associated with the HE Operation element 600 is a multi-BSS AP. The TX BSSID Indicator subfield 646 may store at least 1 bit of data indicating whether the originating BSS (such as the BSS responsible for transmitting the HE Operation element 600) is a transmitted BSS. Thus, upon receiving a beacon frame, the HE STA 320 may quickly identify the originating BSS as a transmitted BSS or a non-transmitted BSS based on the value stored in the TX BSSID Indicator subfield 646.

In some implementations, the TX BSSID Indicator subfield 646 may store information indicating the identity or address of a transmitted BSS. For example, in some aspects, the BSSID Indicator subfield 646 may store at least 5 bits of data. The first bit of the BSSID Indicator subfield 646 may indicate whether the originating BSS is a transmitted BSS. If the first bit value indicates that the originating BSS is the transmitted BSS, the next 4 bits of the BSSID Indicator subfield 646 may be held in reserve. However, if the first bit value indicates that the originating BSS is not a transmitted BSS, the next 4 bits of the BSSID Indicator subfield 464 may be used to indicate a number (N) of bits in which the addresses of the originating BSS and the transmitted BSS differ (such as N least significant bits (LSBs)). In such implementations, the management frame may include an additional address field storing the bit values of the N LSBs of the transmitted BSS. In some aspects, the address field may be provided in the HE Operation element 600. In some other aspects, the address field may be provided in a separate element (not shown for simplicity). The information stored in the Multiple BSSID AP subfield 644, the TX BSSID Indicator subfield 646, or any combination thereof, may be interpreted as MBID information.

Upon determining that the AP 310 is a multi-BSS AP, the HE STA 320 may then seek out beacons or other management frames from a transmitted BSS associated with the AP 310 (such as beacon 301). In some implementations, the HE STA 320 may use the MBID information or other information provided in the received beacon 303 to identify or acquire beacon frames from a transmitted BSS. In some instances, the HE STA 320 may have already received a beacon frame from a transmitted BSS (such a beacon 301) prior to receiving the beacon 303 with the MBID. Thus, in some aspects, the HE STA 320 may use the MBID information to search the beacons it has already received (such as a recent history of received beacons) for MBE information associated with a transmitted BSS. The HE STA 320 may then use the received MBE information to associate (or reassociate) with a Multiple BSSID-capable BSS (such as BSS1 or BSS2), and to receive multi-BSS management and control frames from a transmitted BSS (such as BSS1).

In some implementations, the MBID information may simply advertise the presence of a multi-BSS AP (such as in an HE operations element, HE capabilities element, or a new information element or extended capabilities element). For example, the MBID information may correspond to the bit value stored in the Multiple BSSID AP subfield 644 of the HE Operation element 600. Thus, upon receiving the MBID information, the HE STA 320 may search or scan additional beacons frames (from other BSSs associated with the AP 310) to determine the identity of a transmitted BSS. In some other implementations, the MBID information may include timing information indicating the time at which a management frame (containing MBE information) is scheduled to be transmitted or broadcast on behalf of a transmitted BSS. Thus, upon receiving the timing information for the next MBE, the HE STA 320 may listen for beacons from the transmitted BSS (such as beacon 301) within a narrower window of time.

Still further, in some other implementations, the MBID information may indicate the BSSID of a transmitted BSS (such as BSS1). In some aspects, the MBID information may include at least part (such as a combination of bits) of the address of the transmitted BSS. In some other aspects, the MBID information may provide a mechanism for deriving the address of the transmitted BSS. For example, the MBID may indicate or identify a number of bits that are common to each BSS of the multi-BSS AP or providing an index or offset, relative to the least significant bits (LSBs) or the most significant bits (MSBs), in which the addresses of each BSS may differ (such as provided in the TX BSSID Indicator subfield 646 of the HE Operation element 600). Thus, upon determining the BSSID of the transmitted BSS, the HE STA 320 may directly seek out the beacons 301 from BSS1 to retrieve the corresponding MBE information.

By configuring a limited number of BSSs (such as BSS1) to broadcast beacons containing MBE information, while configuring other BSSs (such as BSS3) to broadcast beacons containing MBID information, the AP 310 may provide scheduled access to HE STAs (such as STA 320) while also ensuring compatibility with legacy STAs (such as STA 330). Thus, BSS1 and BSS2 may service HE STAs, whereas BSS3 may service legacy STAs (as shown in FIG. 3A, STA 320 may be associated with BSS1 and STA 330 may be associated with BSS3). Moreover, because only BSS1 is a transmitted BSS (whereas BSS2 is a non-transmitted BSS and BSS3 is a legacy BSS), the number of beacons broadcast by the multi-BSS AP may be reduced. Furthermore, HE STAs may be required to decode MBE information from only one BSS (such as BSS1).

In some implementations, the multi-BSS AP 310 may configure multiple BSSs to operate as transmitted BSSs. For example, Basic Service Sets BSS1 and BSS2 may each operate as a transmitted BSS. Thus, BSS1 may broadcast MBE information for a first subset of non-transmitted BSSs (not shown for simplicity) and BSS2 may broadcast MBE information for a second subset of non-transmitted BSSs (not shown for simplicity). In such instances, it may be desirable to ensure that the first and second subsets of non-transmitted BSSs are mutually exclusive. Thus, BSS1 may not advertise BSSID information for any non-transmitted BSSs belonging to the second subset, and BSS2 may not advertise BSSID information for any non-transmitted BSSs belonging to the first subset.

In the example of FIG. 3A, only transmitted BSSs (such as BSS1) and legacy BSSs (such as BSS3) broadcast beacon frames, whereas non-transmitted BSSs (such as BSS2) do not. Thus, legacy STAs (such as STA 330) may be unable to identify or associate with any non-transmitted BSS. However, in some instances, each BSS may be assigned to different groups of users. For example, within a particular company, BSS1 may provide a VLAN for the company's engineering department, BSS2 may provide a VLAN for the company's legal department, and BSS3 may provide a VLAN for the company's sales and marketing department. Thus, if a member of the company's legal department has a legacy STA (that does not support Multiple BSSID functionality), it may be desirable to enable the legacy STA to associate with BSS2 even though BSS2 is a non-transmitted BSS.

Figure 3B:
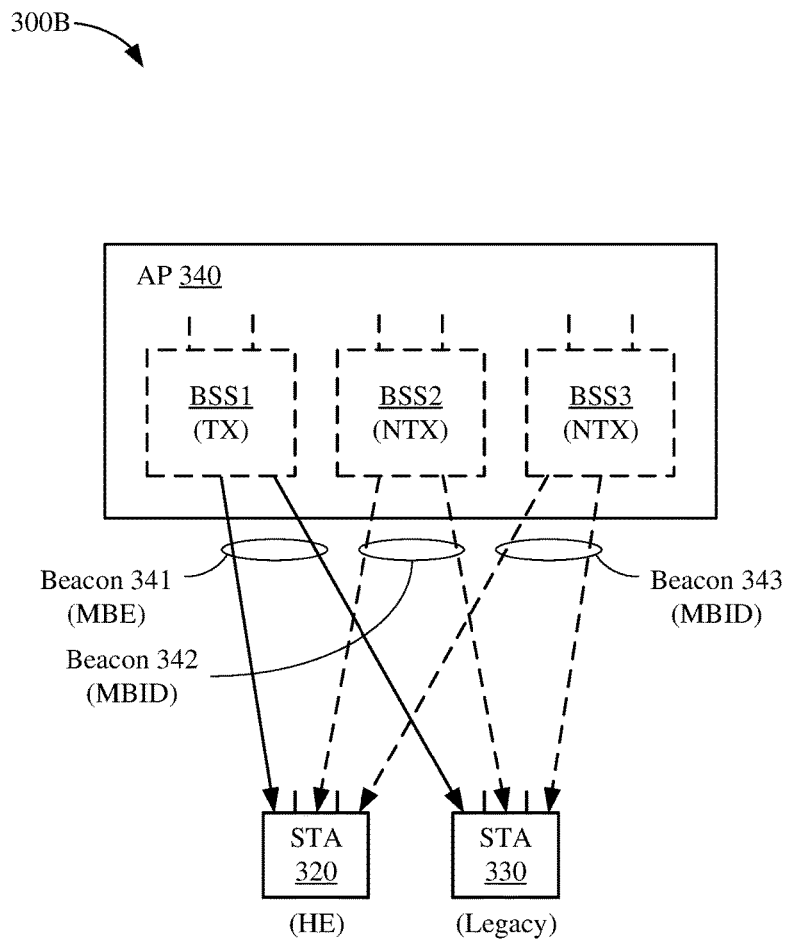

FIG. 3B shows another example Multiple BSSID wireless system 300B with a single transmitted BSS. The system 300B includes the STAs 320 and 330 and an AP 340. In the example of FIG. 3B, the AP 340 is a multi-BSS AP serving as three Basic Service Sets BSS1-BSS3 (or virtual APs). Each of the Basic Service Sets BSS1-BSS3 may correspond to a different VLAN (such as virtual local area networks VLAN1-VLAN3, respectively, of FIG. 1).

In the example of FIG. 3B, BSS1 may be a transmitted (TX) BSS, whereas BSS2 and BSS3 may be non-transmitted (NTX) BSSs. Accordingly, BSS1 may transmit beacon (or other management frames) 341 with MBE information, including aggregated management information for establishing or maintaining communications with BSS2 and BSS3. In some implementations, BSS2 and BSS3 also may transmit beacon (or other management) frames 342 and 343, respectively. However, because neither BSS2 nor BSS3 is a transmitted BSS, their respective beacon frames 342 and 343 may not include MBE information. In other words, none of the beacon frames 342 or 343 may include aggregated management information for two or more BSSs. Rather, beacon frame 342 may include non-aggregated management information for establishing or maintaining communications only with BSS2, and beacon frame 343 may include non-aggregated management information for establishing or maintaining communications only with BSS3. Thus, legacy STAs (such as STA 330 or HE STAs implementing legacy communications) may associate with BSS2 or BSS3 using the non-aggregated management information provided in beacon frames 342 or 343. On the other hand, HE STAs (such as STA 320) may associate with BSS2 or BSS3 using the aggregated management information provided in beacon frame 341.

In some implementations, beacons (and other management frames) transmitted by a non-transmitted BSS may include an MBID. As described with respect to FIG. 3A, the MBID may advertise or otherwise indicate (to HE STAs) that the AP 340 is a multi-BSS AP. For example, each of the beacons 342 and 343 transmitted by BSS2 and BSS3, respectively, may include an MBID. The legacy STA 330 may ignore the MBID information provided in the beacons 342 and 343 and may treat such beacons as legacy beacon frames. However, upon detecting the MBID information in a received beacon (such as beacon 342 or 343), the HE STA 320 may be alerted to the fact that the AP 340 is a multi-BSSID. Upon determining that the AP 340 is a multi-BSS AP, the HE STA 320 may further search for beacons or other management frames from a transmitted BSS associated with the AP 340 (such as beacon 341). As described with respect to FIG. 3A, in some implementations, the HE STA 320 may leverage information included in the MBID to narrow its search for a transmitted BSS (such as BSS1).

In some implementations, the beacons 341 transmitted by BSS1 also may include non-aggregated management information for BSS1. Thus, the legacy STA 330 may associate with any of the Basic Service Sets BSS1-BSS3 of the multi-BSS AP 340 using the non-aggregated management information provided in the beacons 341-343. In some other implementations, the aggregated management information provided in the beacons 341 may not include information for establishing or maintaining communications with BSS1. Thus, the HE STA 320 may not associate with the transmitted Basic Service Set BSS1. Still further, in some implementations, the beacons 341 may not include aggregated or non-aggregated management information for BSS1. Thus, BSS1 may function only as a proxy for one or more non-transmitted BSSs (such as BSS2 and BSS3). However, no STAs may associate with the transmitted Basic Service Set BSS1.

By configuring the transmitted BSS (such as BSS1) to broadcast beacons containing MBE information, while configuring non-transmitted BSSs (such as BSS2 and BSS3) to broadcast beacons without the MBE information, the AP 340 may provide scheduled channel access to any of the Basic Service Sets BSS1-BSS3 for HE STAs (such as STA 320), while also providing (legacy) access to any of the Basic Service Sets BSS1-BSS3 for legacy STAs (such as STA 330). Moreover, because the non-transmitted BSSs (such as BSS2 and BSS3) may be configured to transmit beacons with MBID information, HE STAs have a means of detecting or identifying the transmitted BSS (such as BSS1) and may thus be prevented from locking on to the legacy functionality of any of the non-transmitted BSSs.

Figure 4A:
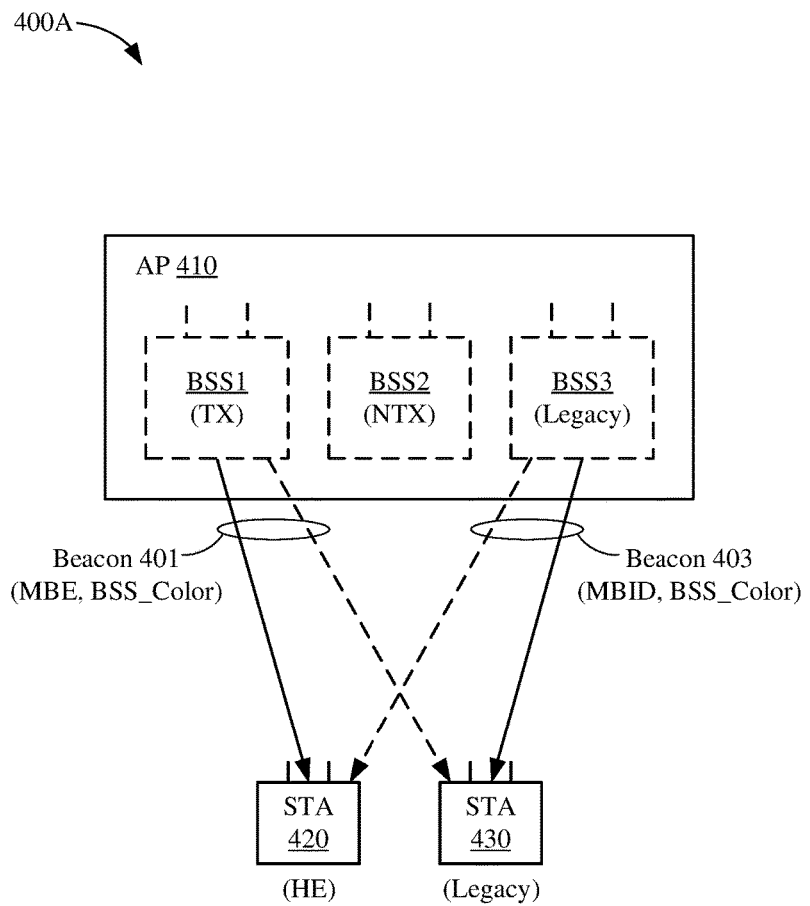
FIGS. 4A and 4B show other example Multiple BSSID wireless systems with a single transmitted BSS.

FIG. 4A shows another example Multiple BSSID wireless system 400A with legacy support. The system 400A includes an AP 410 and a number of STAs 420 and 430. In the example of FIG. 4A, the AP 410 is a multi-BSS AP serving as three Basic Service Sets BSS1-BSS3 (or virtual APs). Each of the Basic Service Sets BSS1-BSS3 may correspond to a different VLAN (such as virtual local area networks VLAN1-VLAN3, respectively, of FIG. 1). Further, in the example of FIG. 4A, STA 420 is an HE STA that supports Multiple BSSID functionality, whereas STA 430 is a legacy STA that does not support Multiple BSSID functionality.

In some implementations, BSS1 may be a transmitted (TX) BSS, BSS2 may be a non-transmitted (NTX) BSS, and BSS3 may be a legacy BSS. Accordingly, BSS1 may transmit beacon (or other management) frames 401 with MBE information. Since BSS2 does not transmit any beacon (or other management) frames, access to BSS2 may be managed through BSS1. More specifically, the MBE information provided in the beacons 401, broadcast by BSS1, may advertise BSSID information (such as aggregated or combined TIM) for multiple Basic Service Sets BSS1 and BSS2. For example, the beacons 401 may include a Multiple BSSID element (such as the Multiple BSSID element 500 of FIG. 5). The HE STA 420 may receive the beacons 401 from BSS1 and implement the Multiple BSSID functionality indicated in the MBE (including a scheduled channel access scheme). More specifically, the HE STA 420 may use the MBE information to associate (or reassociate) with any of the Multiple BSSID-configured Basic Service Sets BSS1 or BSS2, and to receive multi-BSS management and control frames from a transmitted BSS (such as BSS1).

In some implementations, the beacons 401 broadcast by BSS1 also may include non-aggregated management information for BSS1. Thus, in some aspects, the legacy STA 430 also may receive beacons 401 from BSS1 and implement legacy management functionality (such as associating with, or maintaining a connection to, BSS1). In some other implementations, the beacons 401 broadcast by BSS1 may not include any non-aggregated management information. For example, to prevent unscheduled access to BSS1 (and reduce overhead), the transmitted Basic Service Set BSS1 may broadcast its beacons 401 with aggregated management information only (thereby restricting access to HE STAs). Thus, in some other aspects, the legacy STA 430 may be unable to decode the beacons 401 broadcast by BSS1.

Still further, in some implementations, the aggregated management information provided in the beacons 401 may not include information for establishing or maintaining communications with BSS1. For example, in some aspects, a transmitted BSS (such as BSS1) may function only as a communications proxy for one or more non-transmitted BSSs (such as BSS2). In other words, no STAs may associate with BSS1. In some other implementations, only legacy STAs (or HE STAs implementing legacy communications) may associate with a transmitted BSS (using non-aggregated management information provided in the beacons 401), whereas HE STAs may use the aggregated information provided in the beacons 401 to associate with a non-transmitted BSS.

The legacy Basic Service Set BSS3 may transmit beacon (or other management) frames 403 without MBE information, for example, to provide support for legacy STAs (such as STA 430). For example, the beacons 403 may include non-aggregated management information for establishing or maintaining communications with BSS3 only. In some implementations, the beacons 403 may not contain aggregated management information. However, the beacons 403 may be broadcast with MBID information to advertise, or otherwise indicate (to HE STAs), that the AP 410 is a multi-BSS AP. The legacy STA 430 may ignore the MBID information provided in the beacons 401, and may treat such beacons as legacy beacon frames. However, the HE STA 420 may detect the MBID information in a received beacon (such as beacon 403), and may be alerted to the fact that the AP 410 is a multi-BSS AP.

In some implementations, the presence of MBID information (or lack of MBE information) in a received beacon frame may indicate, to an HE STA, that the originating BSS (such as BSS3) is not a transmitted BSS. In some other implementations, one or more of the beacons 401 and 403 may include a field (provided in an HE operations element, HE capabilities element, or a new information element or extended capabilities element) indicating whether the associated BSS (BSS1 or BSS3, respectively) is a transmitted BSS. For example, each of the beacons 401 and 403 may include a Multiple BSSID AP subfield indicating whether the originating AP is a multi-BSS AP (such as the Multiple BSSID AP subfield 644 of the HE Operation element 600), and a TX BSSID Indicator subfield indicating whether the originating BSS is a transmitted BSS (such as the TX BSSID Indicator subfield 646 of the HE Operation element 600).

Upon determining that the AP 410 is a multi-BSS AP, the HE STA 420 may then seek out beacons or other management frames from a transmitted BSS associated with the AP 410 (such as beacon 401). In some implementations, the HE STA 420 may use BSS color information to identify or acquire beacon frames from a transmitted BSS. For example, each of the Basic Service Sets BSS1 and BSS3 may broadcast BSS color information (BSS_Color) with their respective beacons 401 and 403. The IEEE 802.11ax specification defines a BSS color indicator that may be used to differentiate BSSs in dense deployment scenarios. Because the BSS color indicator may be provided in the physical layer (PHY) header (such as a high efficiency signaling A (HE SIG A) field) of communication frames, wireless devices (such as APs and STAs) may quickly identify BSS color information from a received communication frame. In some implementations, an HE STA also may retrieve BSS color information from the HE Operation element of a received beacon frame. With reference for example to FIG. 6, the HE Operation Parameters field 640 may further include a BSS Color subfield 642 storing 6 bits of data indicating the BSS color of the originating BSS. The BSS color is typically used to differentiate BSSs provided by different APs in close physical proximity. However, a multi-BSS AP (such as AP 410) may use the same BSS color for each of its associated BSSs (such as BSS1-BSS3). Accordingly, each of the beacons 401 and 403 may advertise the same BSS color.

In some aspects, the HE STA 420 may leverage the BSS color information included in the beacon frames 403 broadcast by the legacy Basic Service Set BSS3 to search for and identify the beacon frames 401 broadcast by the transmitted Basic Service Set BSS1. For example, upon determining that the AP 410 is a multi-BSS AP and that BSS3 is a legacy BSS (based on a presence of MBID information, or lack of MBE information, in the received beacon frame 403), the HE STA 420 may then search for other beacon frames with the same BSS color as that of the received beacon frame 403. This may allow the HE STA 420 to narrow its search scope to other beacons broadcast by AP 410 (such as by filtering any beacon frames with a different BSS color). More specifically, the HE STA 420 may quickly identify the beacon frames 401 (containing MBE information) based on the BSS color advertised by the beacon frames 401. In some instances, the HE STA 420 may have already received a beacon (such as beacon 401) containing MBE information. Thus, the HE STA 420 may use the BSS color information to search the beacons it has already received (such as a recent history of received beacons) for MBE information associated with a transmitted BSS.

In some implementations, the multi-BSS AP 410 may configure multiple BSSs to operate as transmitted BSSs. For example, Basic Service Sets BSS1 and BSS2 may each operate as a transmitted BSS. Thus, BSS1 may broadcast MBE information for a first subset of non-transmitted BSSs (not shown for simplicity) and BSS2 may broadcast MBE information for a second subset of non-transmitted BSSs (not shown for simplicity). In such instances, it may be desirable to ensure that the first and second subsets of non-transmitted BSSs are mutually exclusive. Thus, BSS1 may not advertise BSSID information for any non-transmitted BSSs belonging to the second subset, and BSS2 may not advertise BSSID information for any non-transmitted BSSs belonging to the first subset.

Figure 4B:
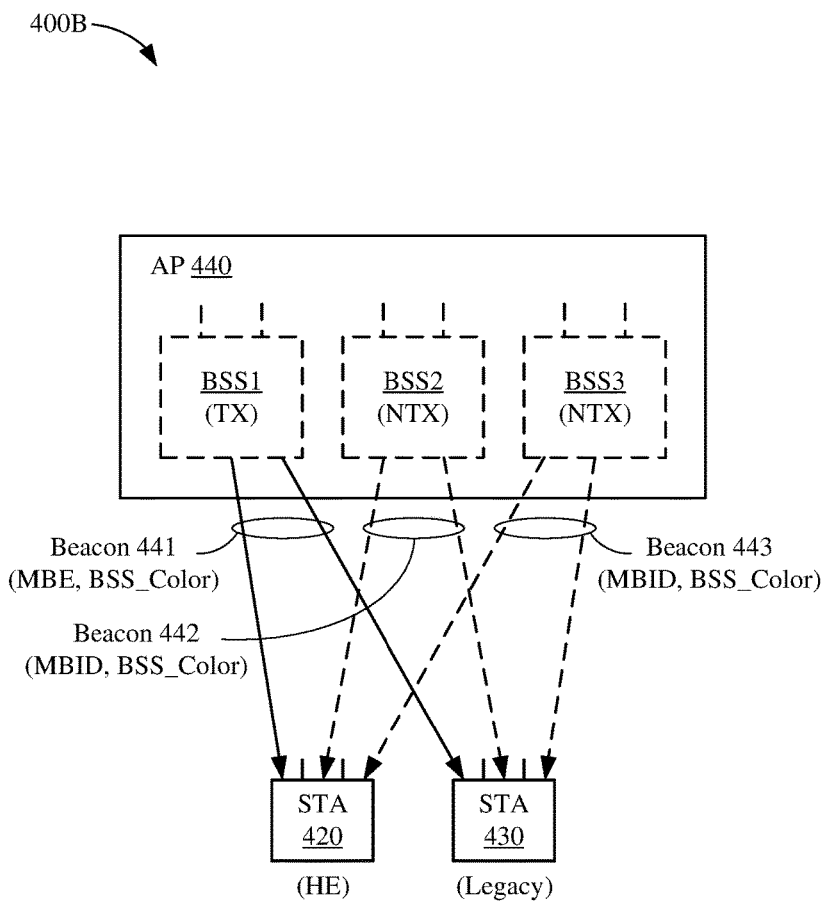

FIG. 4B shows another example Multiple BSSID wireless system 400B with a single transmitted BSS. The system 400B includes the STA 420 and 430 and an AP 440. In the example of FIG. 4B, the AP 440 is a multi-BSS AP service as three Basic Service Sets BSS1-BSS3 (or virtual APs). Each of the Basic Service Sets BSS1-BSS3 may correspond to a different VLAN (such as virtual local area networks VLAN1-VLAN3, respectively, of FIG. 1).

In the example of FIG. 4B, BSS1 may be a transmitted (TX) BSS, whereas BSS2 and BSS3 may be non-transmitted (NTX) BSSs. Accordingly, BSS1 may transmit beacon (or other management frames) 441 with MBE information, including aggregated management information for establishing or maintaining communications with BSS2 and BSS3. In some implementations, BSS2 and BSS3 also may transit beacon (or other management frames) 442 and 443, respectively. However, because neither BSS2 nor BSS3 is a transmitted BSS, their respective beacon frames 442 and 443 may not include MBE information. In other words, none of the beacon frames 442 and 443 may include aggregated management information for two or more BSSs. Rather, beacon frame 442 may include non-aggregated management information for establishing or maintaining communications only with BSS2, and beacon frame 443 may include non-aggregated management information for establishing or maintaining communications only with BSS3. Thus, legacy STAs (such as STA 430 or HE STAs implementing legacy communications) may associate with BSS2 or BSS3 using the non-aggregated management information provided in beacon frames 442 or 443. On the other hand, HE STAs (such as STA 420) may associate with BSS2 or BSS3 using the aggregated management information provided in beacon frame 441.

In some implementations, beacons (and other management frames) transmitted by a non-transmitted BSS may include an MBID. For example, each of the beacons 442 and 443 transmitted by BSS2 and BSS3, respectively, may include an MBID. The legacy STA 430 may ignore the MBID information provided in the beacons 442 and 443 and may treat such beacons as legacy beacon frames. However, upon detecting the MBID information in a received beacon (such as beacon 442 or 443), the HE STA 420 may be alerted to the fact that the AP 440 is a multi-BSS AP. Upon determining that the AP 440 is a multi-BSS AP the HE STA 420 may further search for beacons or other management frames from a transmitted BSS associated with the AP 440 (such as beacon 441). As described with respect to FIG. 4A, in some implementations, the HE STA 420 may leverage the BSS color of a beacon received from a non-transmitted BSS (such as beacon 442 or 443) to narrow its search for a transmitted BSS (such as BSS1). For example, each of the beacons 441-443 may advertise the same BSS color.

In some implementations, the beacons 441 transmitted by BSS1 also may include non-aggregated management information for BSS1. Thus, the legacy STA 430 may associate with any of the Basic Service Sets BSS1-BSS3 of the multi-BSS AP 440 using the non-aggregated management information provided in the beacons 441-443. In some other implementations, the aggregated management information provided in the beacons 441 may not include information for establishing or maintaining communications with BSS1. Thus, the HE STA 420 may not associate with the transmitted Basic Service Set BSS1. Still further, in some implementations, the beacons 441 may not include aggregated or non-aggregated management information for BSS1. Thus, BSS1 may function only as a proxy for one or more non-transmitted BSSs (such as BSS2 and BSS3). However, no STAs may associate with the transmitted Basic Service Set BSS1.

In some implementations, the Multiple BSSID functionality may be disabled for a particular HE STA. For example, the HE STA may indicate that it does not support Multiple BSSID by disabling (or zeroing) the Multiple BSSID bit (such as bit 22) in an extended capabilities element communicated to a multi-BSS AP. By disabling the Multiple BSSID bit, the HE STA may indicate that it does not support any Multiple BSSID capabilities (such as interpreting a multi-BSS TIM, MBE, and the like). Accordingly, the multi-BSS AP may treat the HE STA as a legacy STA for purposes of scheduling or managing communications with the STA. In some other implementations, the HE STA may indicate that it does not support the multi-BSS extension to control frames by disabling a bit (such as by setting the bit value to zero) in the HE capabilities element of communication frames sent to a multi-BSS AP. When implemented in control frames, a multi-BSS AP may refrain from sending multi-BSS control frames to any HE STAs that have indicated they do not support Multiple BSSID functionality in this manner. However, in some aspects, the multi-BSS AP may still transmit multi-BSS management frames to such HE STAs.

Figure 7A:
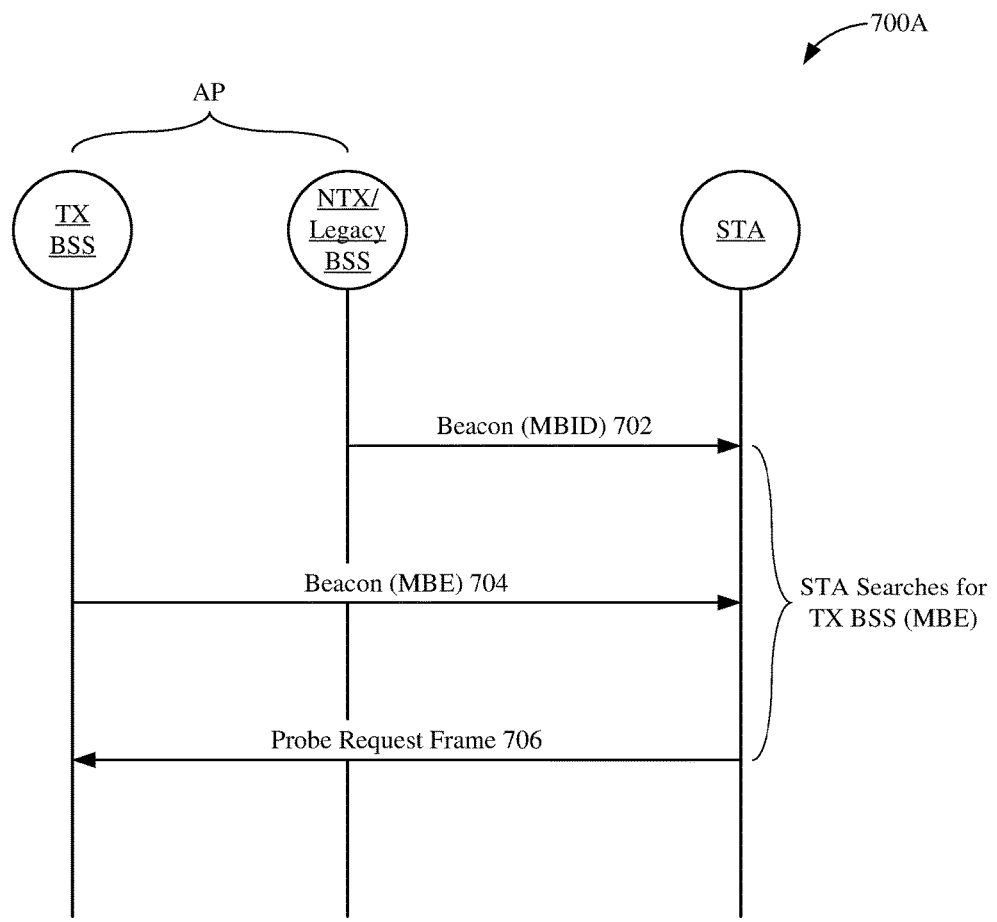
FIGS. 7A and 7B show sequence diagrams depicting example processes for identifying and communicating with a transmitted BSS in a Multiple BSSID wireless system.

FIG. 7A shows a sequence diagram 700A depicting an example process for identifying and communicating with a transmitted BSS in a Multiple BSSID wireless system. More specifically, the sequence diagram 700A shows a communication exchange between a STA (such as an HE STA) and an AP (such as a multi-BSS AP). With reference for example to FIGS. 3 and 4, the AP may correspond to AP 310 or AP 410, and the STA may correspond to HE STA 320 or HE STA 420. The AP may provide a transmitted (TX) BSS and a non-transmitted (NTX) or legacy BSS. Although only two BSSs are shown for simplicity, in actual implementations, the AP may serve as any number of BSSs (including one or more non-transmitted BSSs).

The STA initially searches for a BSS to associate with. For example, the STA may be listening to one or more wireless channels for any beacon frames that may be broadcast by one or more APs in the vicinity. In the example of FIG. 7A, the STA may first receive a beacon frame 702 broadcast by the AP on behalf of the non-transmitted or legacy BSS. For example, the transmitter address of the beacon frame 702 may specify the address of the non-transmitted or legacy BSS. More specifically, the beacon frame 702 may include an MBID. Based on the presence of the MBID in the received beacon frame 702, the STA may determine that the AP is a multi-BSS AP and the originating BSS is a non-transmitted or legacy BSS. Since the STA has HE capabilities, the STA does not immediately associate with the non-transmitted or legacy BSS, but rather searches for the transmitted BSS associated with the AP. For example, the STA may search for beacon (or other management) frames broadcast by the AP on behalf of the transmitted BSS (such as beacon frames having the address of the transmitted BSS as the transmitter address).

In some implementations, the STA may use information provided in the MBID to narrow its search for the transmitted BSS (such as described with respect to FIGS. 3A and 3B). For example, in some aspects, the MBID information may include timing information indicating the time at which a management frame (containing MBE information) is scheduled to be transmitted or broadcast on behalf of the transmitted BSS. In some other aspects, the MBID information may indicate the BSSID of the transmitted BSS. Still further, in some aspects, the MBID information may provide a mechanism for deriving the address of the transmitted BSS (such as by indicating or identifying a number of bits that are common to each BSS of the multi-BSS AP or providing an index or offset, relative to the LSBs or MSBs, at which the addresses of each BSS may differ).

In some other implementations, the STA may leverage BSS color information from the received beacon frame 702 to narrow its search for the transmitted BSS (such as described with respect to FIGS. 4A and 4B). For example, each of the BSSs associated with the AP may broadcast beacon frames with the same BSS color. Thus, upon determining the BSS color of the received beacon frame 702, the STA may then search for other beacon frames having the same BSS color as that of the received beacon frame 702. Since the BSS color information may be provided in the PHY header of a received communication frame, the STA may quickly filter or discard any communication frames that do not have the same BSS color as that of the received beacon frame 702.

In the example of FIG. 7A, the STA continues to listen for additional beacon frames from the AP after detecting the MBID in the first received beacon frame 702. As described above, the STA may filter or narrow its search based on the MBID information or BSS color of the received beacon frame 702. The STA subsequently receives a second beacon frame 704 broadcast by the AP on behalf of the transmitted BSS. For example, the transmitter address of the beacon frame 704 may specify the address of the transmitted BSS. More specifically, the beacon frame 704 may include an MBE. The MBE may include aggregated management information for establishing or maintaining communications with the transmitted BSS and at least one additional BSS associated with the AP (not shown for simplicity). Based on the presence of the MBE in the received beacon frame 704, the STA may determine that the originating BSS is a transmitted BSS. Thus, the STA may use the information provided in the received beacon frame 704 to associate with the transmitted BSS. For example, the STA may send a probe request frame 706 to the transmitted BSS to initiate an association procedure.

Figure 7B:
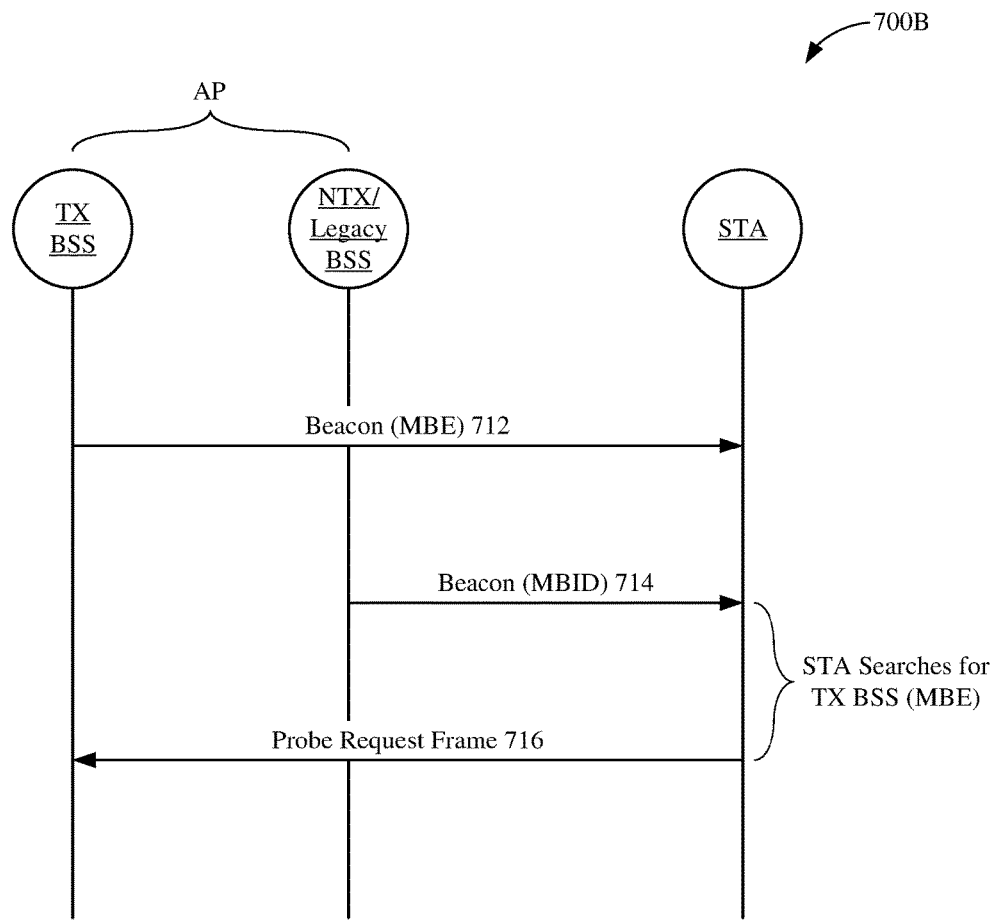

FIG. 7B shows a sequence diagram 700B depicting another example process for identifying and communicating with a transmitted BSS in a Multiple BSSID wireless system. More specifically, the sequence diagram 700B shows a communication exchange between the STA and the AP of FIG. 7A, in which the STA receives a beacon frame from the transmitted BSS prior to receiving a beacon frame from the non-transmitted or legacy BSS.

The STA initially searches for a BSS to associate with. For example, the STA may be listening to one or more wireless channels for any beacon frames that may be broadcast by one or more APs in the vicinity. In the example of FIG. 7B, the STA may first receive a beacon frame 712 from the transmitted BSS, and subsequently receive a beacon frame 714 from the non-transmitted or legacy BSS. For example, the STA may receive the beacon frames 712 and 714 during a passive scanning operation. Thus, each of the beacon frames 712 and 714 may be added to a queue within the STA. Due to one or more properties of the received beacon frames 712 and 714 (or the order in which they were received), the STA may first inspect the beacon frame 714 from the non-transmitted or legacy BSS.

The beacon frame 714 received from the non-transmitted or legacy BSS may include an MBID. Based on the presence of the MBID in the received beacon frame 714, the STA may determine that the AP is a multi-BSS AP and the originating BSS is a non-transmitted or legacy BSS. Since the STA has HE capabilities, the STA does not immediately associate with the non-transmitted or legacy BSS, but rather searches for the transmitted BSS associated with the AP. For example, the STA may search for beacon (or other management frames) broadcast by the AP on behalf of the transmitted BSS (such as beacon frames having the address of the transmitted BSS as the transmitter address). In some implementations, the STA may use information provided in the MBID to narrow its search for the transmitted BSS (such as described with respect to FIGS. 3A and 3B). In some other implementations, the STA may leverage BSS color information from the received beacon frame 714 to narrow its search for the transmitted BSS (such as described with respect to FIGS. 4A and 4B).

In the example of FIG. 7B, the STA has already received a beacon frame from the transmitted BSS. Thus, the STA may search its queue of received beacon frames to detect or identify the previously-received beacon frame 712 from the transmitted BSS. As described above, the STA may filter or narrow its search based on the MBID information or BSS color of the beacon frame 714 received from the non-transmitted or legacy BSS. The beacon frame 712 may include an MBE. In some aspects, the STA may identify the beacon frame 712 as originating from the transmitted BSS based on the presence of the MBE. Thus, the STA may use the information provided in the received beacon frame 712 to associate with the transmitted BSS. For example, the STA may send a probe request frame 716 to the transmitted BSS to initiate an association procedure.

Figure 8:
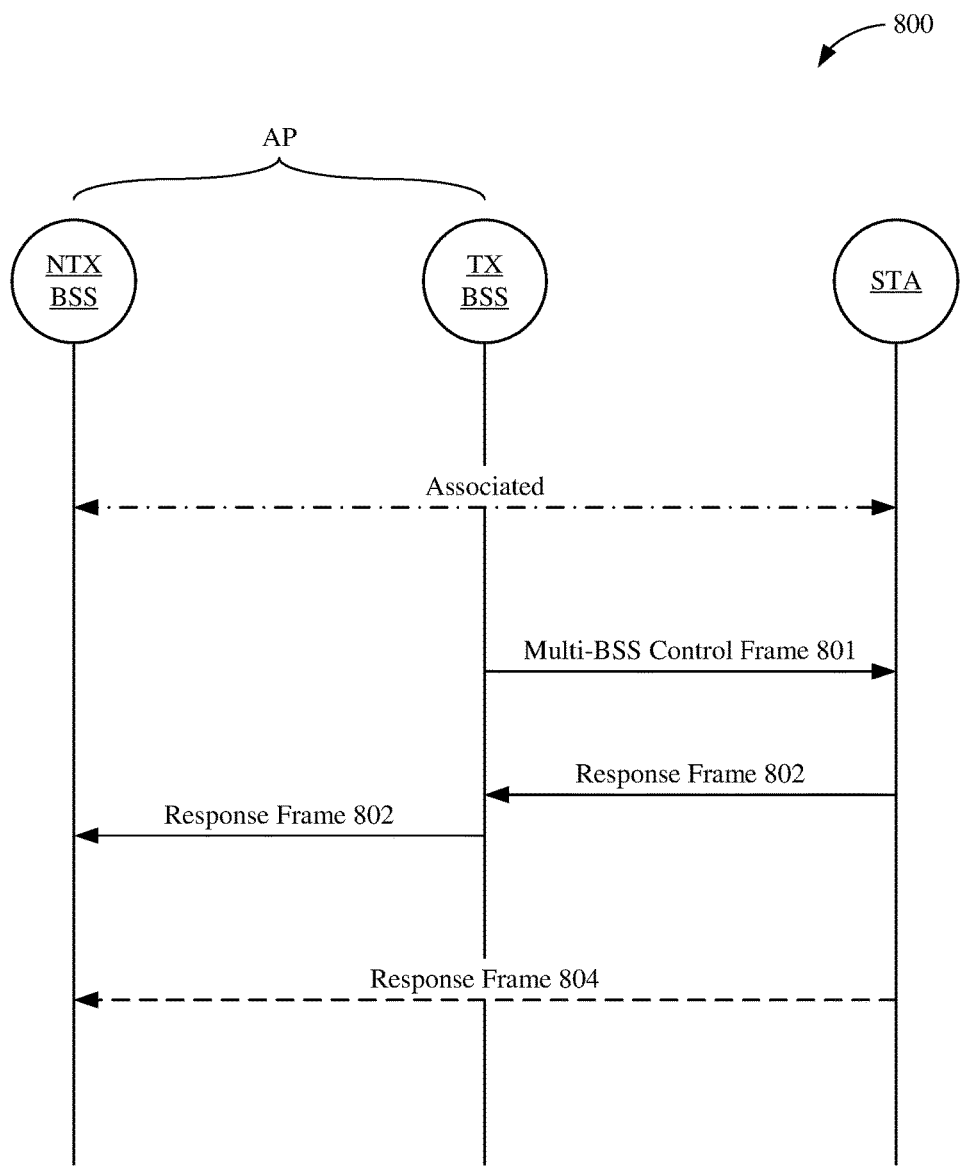
FIG. 8 shows a sequence diagram depicting example multi-BSS communications within a Multiple BSSID wireless system.

FIG. 8 shows a sequence diagram 800 depicting example multi-BSS communications within a Multiple BSSID wireless system. More specifically, the sequence diagram 800 shows a communication exchange between a STA (such as an HE STA) and an AP (such as a multi-BSS AP). With reference for example to FIGS. 3 and 4, the AP may correspond to AP 310 or AP 410, and the STA may correspond to HE STA 320 or HE STA 420. The AP may provide a transmitted (TX) BSS and a non-transmitted (NTX) BSS. Although only two BSSs are shown for simplicity, in actual implementations, the AP may serve as any number of BSSs (including one or more legacy BSSs).

In the example of FIG. 8, the STA may be associated with the NTX BSS. While associated with the NTX BSS, the STA also may listen to communication frames (such as management or control frames) transmitted or broadcast by the TX BSS. For example, since the NTX BSS does not broadcast its own BSSID information, the STA may receive BSSID information for the NTX BSS via a Multiple BSSID element included in management frames broadcast by the TX BSS. In some implementations, the TX BSS also may transmit multi-BSS control frames to one or more HE STAs. For example, the multi-BSS control frame may correspond to a trigger frame used for soliciting and allocating resources for uplink transmissions by one or more HE STAs.

Trigger or control frames are typically used to control access to a single BSS (such as the BSS that transmitted the control frame). For example, a conventional control frame may include a transmitter address (TA) field specifying the address of a particular BSS, and a receiver address (RA) field specifying the address of a recipient STA associated with the particular BSS or a broadcast address (when targeting multiple STAs associated with the BSS). In contrast, a multi-BSS control frame (which may include trigger frames, null data packet announcement (NDPA) frames, multi-STA block acknowledgement (BA) frames, multi-user request to send (RTS) frames, and the like) may be directed to multiple STAs that may be associated with different BSSs. For example, the multi-BSS control frame may include multiple User Information fields that may be used to provide information for multiple BSSs. The TA field of a multi-BSS control frame may specify the address of the TX BSS (regardless of which BSSs are implicated in the User Information fields), and the RA field of the multi-BSS control frame may specify a broadcast address or a "common address" representing all BSSs of the multi-BSS AP. In some aspects, the address of the TX BSS may be used as the common address for addressing STAs belonging to multiple BSSs. Accordingly, an HE STA may not discard any multi-BSS control frames with a TA field specifying the address of the transmitted BSS (such as the TX BSS) or its associated BSS (such as the NTX BSS).

In some aspects, the STA may receive a multi-BSS control frame 801 from the TX BSS. The STA may determine that the multi-BSS control frame 801 is transmitted by the TX BSS, for example, by identifying the address of the TX BSS in the TA field of the control frame 801. Upon determining that the multi-BSS control frame 801 is transmitted by the TX BSS, the STA may then determine whether the STA is an intended recipient of the control frame 801. For example, the STA may determine whether its address, or a broadcast or common address, is specified in the RA field of the multi-BSS control frame 801. If the STA is an intended recipient of the multi-BSS control frame 801, the STA may send a response frame back to the AP. In some implementations (depending on the multi-BSS frame type), the STA may specify the address of its associated BSS (such as NTX BSS) or the address of the transmitted BSS (such as TX BSS) in the RA field of the response frame.

In some aspects, it may be desirable for the STA to send a response frame 802 to the TX BSS. For example, a trigger frame typically requires a quick response (within a short interframe space (SIFS) duration) by the recipient of the trigger frame. If the STA is simply responding to acknowledge (ACK) the trigger frame, it may be quickest to copy the address specified in the TA field of the trigger frame (such as the address of the TX BSS) to the RA field of the ACK frame. However, in other aspects, it may be desirable for the STA to send a response frame 804 directly to its associated BSS (NTX BSS). For example, the STA may have buffered uplink data already tagged for transmission to the NTX BSS when the STA receives the trigger frame. Thus, it may be faster to transmit the buffered data as-is (with the RA field specifying the address of the NTX BSS) than to re-tag the buffered data with the address of the TX BSS.

In some implementations, the AP may ensure that any communications transmitted by the STA are received by the appropriate BSS. For example, a response frame specifying a non-transmitted BSS in its RA field (such as response frame 804) may be directly received by the intended BSS. However, if a response frame specifies a transmitted BSS in its RA field (such as response frame 802), the AP may analyze the response frame to determine whether the intended recipient is the transmitted BSS or another (non-transmitted) BSS. For example, the AP may determine (based on the address specified in the TA field) that the response frame 802 was transmitted by the STA associated with the NTX BSS. Thus, after receiving the response frame 802, the TX BSS may forward the response frame 802 (or the information provided therein) to the NTX BSS.

In some aspects, the STA may use frame aggregation techniques to aggregate multiple protocol data units (PDUs) into a single transmission. For example, frame aggregation may be used to aggregate multiple MAC PDUs (MPDUs) into a single A-MPDU. To reduce the overhead of the transmission, shared management information (such as frame headers for individual MPDUs) may be specified only once per A-MPDU. Thus, when using frame aggregation, the STA may ensure that each MPDU of a particular A-MPDU maps to the same RA and TA values. For example, assuming response frame 802 corresponds to an A-MPDU, the STA may ensure that the RA field of each MPDU to be included in the response frame 802 specifies the address of the TX BSS, and that the TA field of each of the MPDUs specifies the address of the STA. Similarly, assuming response frame 804 corresponds to an A-MPDU, the STA may ensure that the RA field of each MPDU to be included in the response frame 804 specifies the address of the NTX BSS, and that the TA field of each of the MPDUs specifies the address of the STA.

Figure 9:
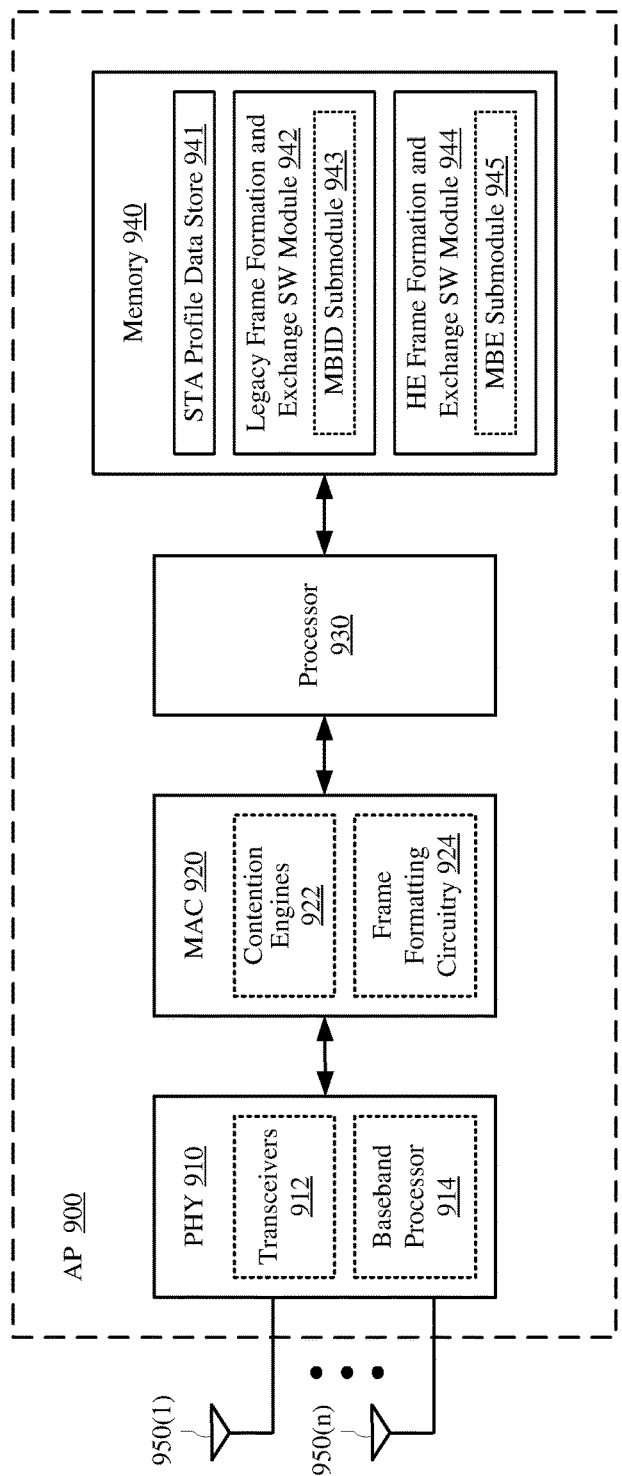
FIG. 9 shows a block diagram of an example access point (AP).

FIG. 9 shows a block diagram of an example access point (AP) 900. In some implementations, the AP 900 may be a multi-BSS AP. For example, the AP 900 may be an implementation of any of the APs 210, 310, or 410 of FIGS. 2-4. The AP 900 may include a PHY 910, a MAC 920, a processor 930, a memory 940, and a number of antennas 950(1)-950(n).

The PHY 910 may include a number of transceivers 912 and a baseband processor 914. The transceivers 912 may be coupled to the antennas 950(1)-950(n), either directly or through an antenna selection circuit (not shown for simplicity). The transceivers 912 may be used to communicate wireless with one or more STAs, with one or more APs, or with other suitable devices. The baseband processor 914 may be used to process signals received from the processor 930 or the memory 940 and to forward the processed signals to the transceivers 912 for transmission via one or more of the antennas 950(1)-950(n), and may be used to process signals received from one or more of the antennas 950(1)-950(n) via the transceivers 912 and to forward the processed signals to the processor 930 or the memory 940.

Although not shown in FIG. 9, for simplicity, the transceivers 912 may include any number of transmit chains to process and transmit signals to other wireless devices via the antennas 950(1)-950(n), and may include any number of receive chains to process signals received from the antennas 950(1)-950(n). Thus, in some implementations, the AP 900 may be configured for MIMO operations including, for example, SU-MIMO operations and MU-MIMO operations. In addition, the AP 900 may be configured for OFDMA communications or other suitable multiple access mechanisms, for example, as may be specified by any of the IEEE 802.11 standards, such as 802.11ax.

The MAC 920 may include at least a number of contention engines 922 and frame formatting circuitry 924. The contention engines 922 may contend for access to the shared wireless medium, and may store packets for transmission over the shared wireless medium. In some implementations, the contention engines 922 may be separate from the MAC 920. Still further, in some implementations, the contention engines 922 may be implemented as one or more software modules (stored in the memory 940 or in memory provided within the MAC 920). The frame formatting circuitry 924 may be used to create or format frames received from the processor 930 or the memory 940 (such as by adding MAC headers to PDUs provided by the processor 930), and may be used to re-format frames received from the PHY 910 (such as by stripping MAC headers from frames received from the PHY 910).

The memory 940 may include a STA profile data store 941 that stores profile information for a plurality of STAs. The profile information for a particular STA may include, for example, its MAC address, supported data rates, connection history with the AP 900 (or one or more BSSs associated therewith), one or more RUs allocated to the STA, and any other suitable information pertaining to or describing the operation of the STA.

The memory 940 also may include a non-transitory computer-readable medium (one or more nonvolatile memory elements, such as EPROM, EEPROM, Flash memory, a hard drive, and the like) that may store at least the following software (SW) modules:
    a legacy frame formation and exchange SW module 942 to facilitate the creation and exchange of any suitable legacy communication frames (such as management frames or control frames) that may be used to establish or maintain legacy communications between the AP 900 and other wireless devices, the legacy frame formation and exchange SW module 942 including:
        a Multiple BSS indicator (MBID) submodule 943 to indicate, in the legacy communication frames, that the AP 900 is a multi-BSS AP; and
    a high-efficiency (HE) frame formation and exchange SW module 944 to facilitate the creation and exchange of any suitable HE communication frames (such as management frames or control frames) that may be used to establish or maintain HE communications between the AP 900 and other wireless devices, the HE frame formation and exchange SW module 944 including:
        a Multiple BSSID element (MBE) submodule 945 to indicate, in the HE communication frames, aggregated management or control information for two or more BSSs associated with the AP 900.

Each software module includes instructions that, when executed by the processor 930, cause the AP 900 to perform the corresponding functions.

For example, the processor 930 may execute the legacy frame formation and exchange SW module 942 to facilitate the creation and exchange of any suitable legacy communication frames (such as management frames or control frames) that may be used to establish or maintain legacy communications between the AP 900 and other wireless devices. In executing the legacy frame formation and exchange SW module 942, the processor 930 may further execute the MBID submodule 943 to indicate, in the legacy communication frames, that the AP 900 is a multi-BSS AP.

The processor 930 also may execute the HE frame formation and exchange SW module 944 to facilitate the creation and exchange of any suitable HE communication frames (such as management frames or control frames) that may be used to establish or maintain HE communications between the AP 900 and other wireless devices. In executing the HE frame formation and exchange SW module 944, the processor 930 may further execute the MBE submodule 945 to indicate, in the HE communication frames, aggregated management or control information for two or more BSSs associated with the AP 900.

Figure 10:
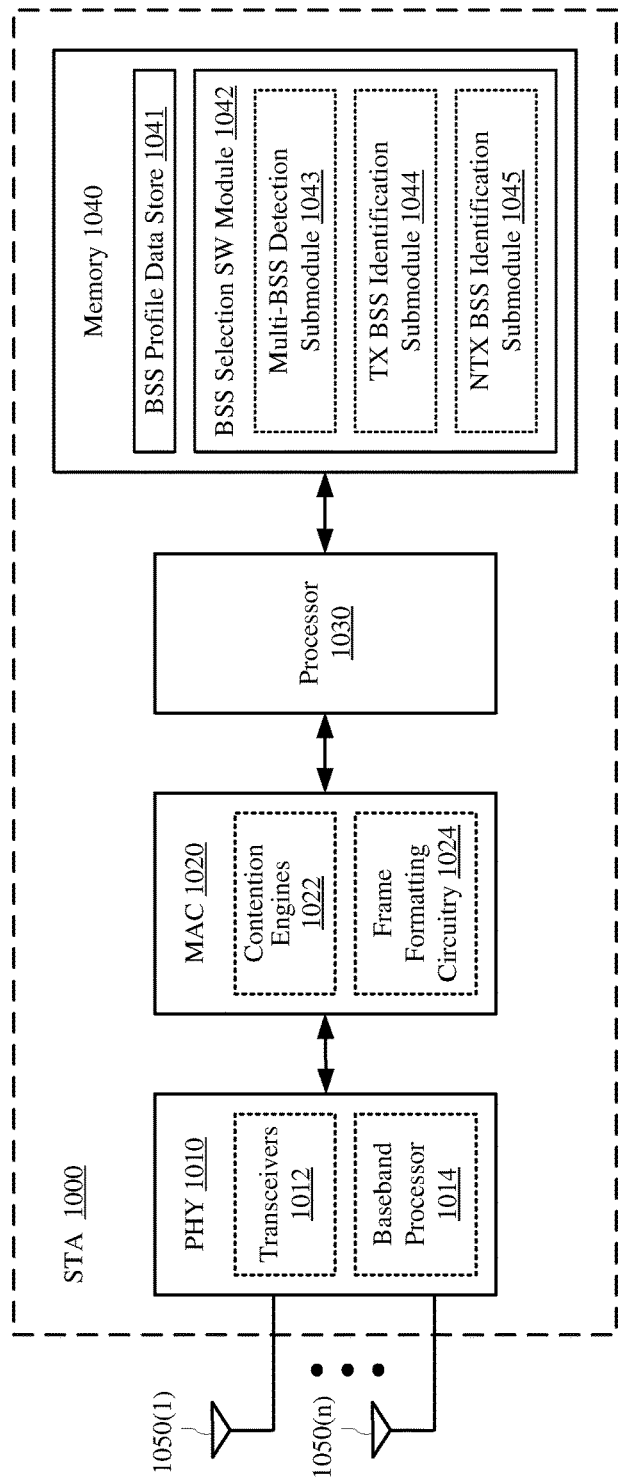
FIG. 10 shows a block diagram of an example wireless station (STA).

FIG. 10 shows a block diagram of an example wireless station (STA) 1000. In some implementations, the STA 1000 may be an HE STA. For example, the STA 1000 may be an implementation of any of the STAs 220, 320, or 420 of FIGS. 2-4. The STA 1000 may include a PHY 1010, a MAC 1020, a processor 1030, a memory 1040, and a number of antennas 1050(1)-1050(n).

The PHY 1010 may include a number of transceivers 1012 and a baseband processor 1014. The transceivers 1012 may be coupled to the antennas 1050(1)-1050(n), either directly or through an antenna selection circuit (not shown for simplicity). The transceivers 1012 may be used to communicate wireless with one or more STAs, with one or more APs, or with other suitable devices. The baseband processor 1014 may be used to process signals received from the processor 1030 or the memory 1040 and to forward the processed signals to the transceivers 1012 for transmission via one or more of the antennas 1050(1)-1050(n), and may be used to process signals received from one or more of the antennas 1050(1)-1050(n) via the transceivers 1012 and to forward the processed signals to the processor 1030 or the memory 1040.

Although not shown in FIG. 10, for simplicity, the transceivers 1012 may include any number of transmit chains to process and transmit signals to other wireless devices via the antennas 1050(1)-1050(n), and may include any number of receive chains to process signals received from the antennas 1050(1)-1050(n). Thus, in some implementations, the STA 1000 may be configured for MIMO operations including, for example, SU-MIMO operations and MU-MIMO operations. In addition, the STA 1000 may be configured for OFDMA communications or other suitable multiple access mechanisms, for example, as may be specified by any of the IEEE 802.11 standards, such as 802.11ax.

The MAC 1020 may include at least a number of contention engines 1022 and frame formatting circuitry 1024. The contention engines 1022 may contend for access to the shared wireless medium, and may store packets for transmission over the shared wireless medium. In some implementations, the contention engines 1022 may be separate from the MAC 1020. Still further, in some implementations, the contention engines 1022 may be implemented as one or more software modules (stored in the memory 1040 or in memory provided within the MAC 1020). The frame formatting circuitry 1024 may be used to create or format frames received from the processor 1030 or the memory 1040 (such as by adding MAC headers to PDUs provided by the processor 1030), and may be used to re-format frames received from the PHY 1010 (such as by stripping MAC headers from frames received from the PHY 1010).

The memory 1040 may include a BSS profile data store 1041 that stores profile information for a plurality of BSSs. The profile information for a particular BSS may include, for example, the BSSID, MAC address, channel information, received signal strength indicator (RSSI) values, goodput values, channel state information (CSI), supported data rates, connection history with the BSS, a trustworthiness value of the BSS (indicating a level of confidence about the BSS's location or other properties associated with the BSS), and any other suitable information pertaining to or describing the operation of the BSS.

The memory 1040 also may include a non-transitory computer-readable medium (one or more nonvolatile memory elements, such as EPROM, EEPROM, Flash memory, a hard drive, and the like) that may store at least the following software (SW) modules:

a BSS selection SW module 1042 to identify and select a particular BSS to associate with, the BSS selection SW module 1042 including:
  a Multi-BSS detection submodule 1043 to detect one or more multi-BSS APs in a vicinity of the STA;
  a transmitted (TX) BSS identification submodule 1044 to identify one or more transmitted BSSs associated with a multi-BSS AP; and
  a non-transmitted (NTX) BSS identification submodule 1045 to identify one or more non-transmitted BSSs associated with the multi-BSS AP.

Each software module includes instructions that, when executed by the processor 1030, cause the STA 1000 to perform the corresponding functions.

For example, the processor 1030 may execute the BSS selection SW module 1042 to identify and select a particular BSS to associate with. In executing the BSS selection SW module 1042, the processor 1030 may further execute the Multi-BSS detection submodule 1043, the TX BSS identification submodule 1044, and the NTX BSS identification submodule 1045. Specifically, the processor 1030 may execute the Multi-BSS detection submodule 1043 to detect one or more multi-BSS APs in a vicinity of the STA. The processor 1030 may execute the TX BSS identification submodule 1044 to identify one or more transmitted BSSs associated with a multi-BSS AP. Further, the processor 1030 may execute the NTX BSS identification submodule 1045 to identify one or more non-transmitted BSSs associated with the multi-BSS AP.

Figure 11:
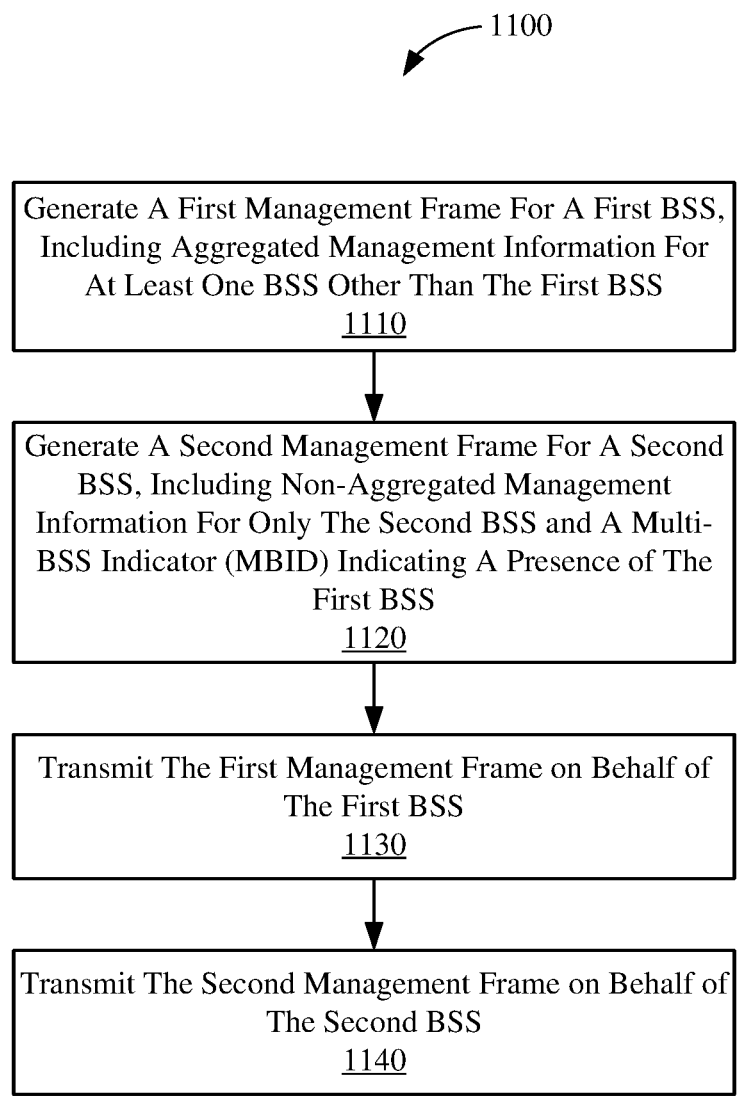
FIG. 11 shows a flowchart depicting an example operation for transmitting management information on behalf of multiple BSSs in a Multiple BSSID wireless system.

FIG. 11 shows a flowchart depicting an example operation 1100 for transmitting management information on behalf of multiple BSSs in a Multiple BSSID wireless system. More specifically, the example operation 1100 may be performed by a multi-BSS AP to enable HE STAs and legacy STAs to establish and maintain wireless communications with one or more BSSs associated with the multi-BSS AP. With reference for example to FIGS. 2-4, the example operation 1100 may be performed by any of the APs 210, 310, or 410.

The AP may generate a first management frame for a first BSS, including aggregated management information for at least one BSS other than the first BSS (1110). For example, the aggregated management information may be included in an MBE of the first management frame. The aggregated management information may be interpreted by an HE STA, and enables the HE STA to establish or maintain HE communications with the at least one other BSS associated with the AP. Specifically, the first BSS may be a transmitted BSS, and the at least one other BSS may be either a transmitted BSS or a non-transmitted BSS. In some implementations, the first management frame also may include non-aggregated management information for establishing or maintaining communications with the first BSS. In some other implementations, the aggregated management information may further include information for establishing or maintaining communications with the first BSS.

The AP also may generate a second management frame for a second BSS, including non-aggregated management information for only the second BSS and a multi-BSS Indicator (MBID) indicating a presence of the first BSS (1120). For example, the non-aggregated management information may be included in one or more legacy packet elements or fields of the second management frame. The non-aggregated management information may be interpreted by HE STAs and legacy STAs, and enables the STAs to establish or maintain legacy communications with the second BSS only. In some implementations the second BSS may be a legacy BSS (such as described with respect to FIG. 3A) or a non-transmitted BSS (such as described with respect to FIG. 3B). Thus, the second management frame may further include an MBID that may be used to indicate, to HE STAs, that the AP is a multi-BSS AP and the second BSS is not a transmitted BSS. However, since a multi-BSS AP includes at least one transmitted BSS, the MBID also may indicate the presence of a transmitted BSS in a vicinity of the HE STA.

The AP may transmit the first management frame on behalf of the first BSS (1130), and may further transmit the second management frame on behalf of the second BSS (1140). For example, the AP may specify the address of the first BSS as the transmitter address of the first management frame, and may specify the address of the second BSS as the transmitter address of the second management frame. In some implementations, the first and second management frames may enable one or more STAs in a vicinity of the AP to establish or maintain communications with any of the BSSs associated with the AP. For example, legacy STAs (or HE STAs operating in a legacy configuration) may communicate with the second BSS using the non-aggregated management information provided in the second management frame, whereas HE STAs may communicate with the first BSS or the at least one other BSS (which may include other transmitted or non-transmitted BSSs) using the aggregated management information provided in the first management frame.

Figure 12:
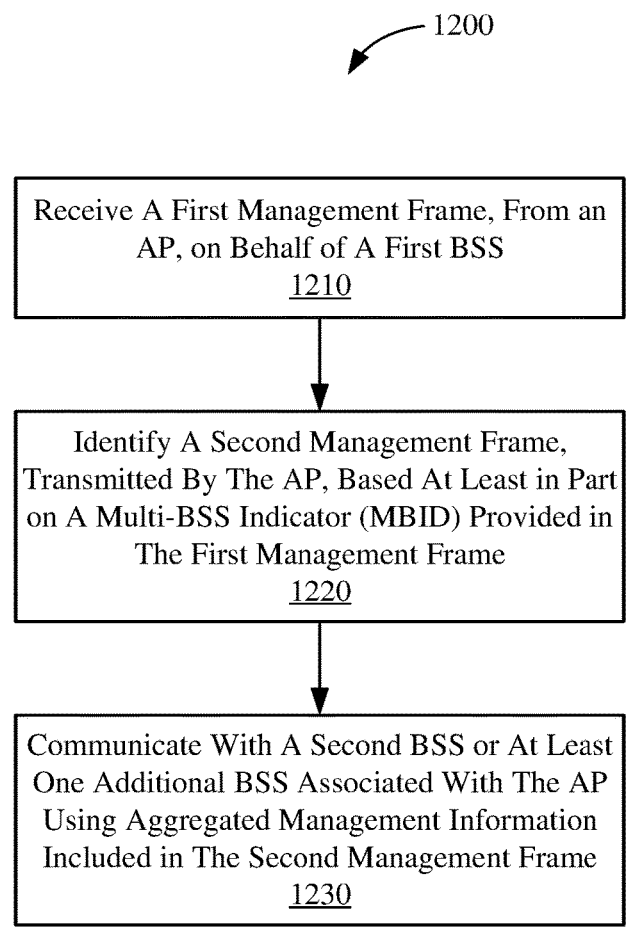
FIG. 12 shows a flowchart depicting an example operation for identifying and communicating with a transmitted BSS in a Multiple BSSID wireless system.

FIG. 12 shows a flowchart depicting an example operation 1200 for identifying and communicating with a transmitted BSS in a Multiple BSSID wireless system. More specifically, the example operation 1200 may be performed by an HE STA to establish or maintain wireless communications with a transmitted (or non-transmitted) BSS associated with a multi-BSS AP. With reference for example to FIGS. 2-4, the example operation 1200 may be performed by any of the STAs 220, 320, or 420.

The STA may receive a first management frame, from an AP, on behalf of a first BSS (1210). For example, the transmitter address of the first management frame may specify the address of the first BSS. In some aspects, the STA may receive the first management frame, along with other management frames, while performing a passible scanning operation to detect APs or BSSs in a vicinity of the STA. Thus, each of the management frames received during the scanning operation may be added to a queue within the STA. In some aspects, the first BSS may be a legacy BSS. For example, the first management frame may include an MBID. Based on the presence of the MBID in the first management frame, the STA may determine that the AP is a multi-BSS AP and the originating BSS is a legacy BSS. Since the STA has HE capabilities, the STA does not immediately associate with the legacy BSS, but rather searches of the transmitted BSS associated with the multi-BSS AP.

The STA may identify a second management frame, transmitted by the AP, based at least in part on an MBID provided in the first management frame (1220). The second management frame may be transmitted on behalf of a transmitted BSS. In some implementations, the STA may use information provided in the MBID to narrow its search for the second management frame. For example, in some aspects, the MBID information may include timing information indicating the time at which the second management frame is scheduled to be transmitted or broadcast on behalf of the transmitted BSS. In some other aspects, the MBID information may indicate the BSSID of the transmitted BSS that transmits the second management frame. Still further, in some aspects, the MBID information may provide a mechanism for deriving the address of the transmitted BSS. In some other implementations, the STA may leverage BSS color information from the first management frame to narrow its search for the second management frame. For example, each of the BSSs associated with the AP may transmit communication frames with the same BSS color. Thus, upon determining the BSS color of the first management frame, the STA may then search for other management frames having the same BSS color as that of the first management frame.

The STA may communicate with a second BSS or at least one additional BSS associated with the AP using aggregated management information included in the second management frame (1230). In some implementations, the STA may receive the second management frame after receiving the first management frame (such as described with respect to FIG. 7A). For example, the STA may listen for additional beacon frames from the multi-BSS AP after detecting the MBID in the first received. In some other implementations, the STA may receive the second management frame prior to receiving the first management frame (such as described with respect to FIG. 7B). For example, the STA may search its queue of received beacon frames to detect or identify the second management frame among previously-received communication frames. As described above, the STA may filter or narrow its search based on the MBID information or BSS color of the first management frame.

The second management frame may include aggregated management information for the second BSS at the at least one additional BSS associated with the AP. For example, the aggregated management information may be included in an MBE of the second management frame. The aggregated management information enables the STA to establish or maintain HE communications with any of the second BSS or the at least one additional BSS associated with the AP. In particular, the STA may communicate with the second BSS or the at least one additional BSS in accordance with a scheduled channel access scheme (such as defined by the IEEE 802.11ax specification).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method, performed by an access point (AP), the method comprising:
generating a first management frame for a first basic service set (BSS) configured to operate in compliance with the IEEE 802.11ax specification, the first management frame including a Multiple BSSID element (MBE), which includes information for establishing or maintaining communications with at least one BSS other than the first BSS, wherein the first BSS provides scheduled access to wireless stations (STAs) associated with the first BSS or the at least one BSS other than the first BSS;
generating a second management frame for a second BSS, the second management frame including information for establishing or maintaining communications with only the second BSS and providing access to STAs associated with the second BSS, including STAs that do not support receiving control frames from the first BSS, wherein the second management frame does not include an MBE but includes a multi-BSS indicator (MBID) indicating that the AP is configured to transmit management frames including MBEs for a BSS other than the second BSS;

transmitting the first management frame, from the AP, for the first BSS;
transmitting the second management frame, from the AP, for the second BSS; and
receiving a first communication frame from a STA associated with the at least one BSS other than the first BSS, the first communication frame indicating a capability of the STA to decode management or control frames transmitted by the AP for the first BSS.

2. The method of claim 1, wherein the MBID advertises the AP as a multi-BSS AP.

3. The method of claim 1, wherein the MBID corresponds to at least one of a single bit value, a BSS identifier (BSSID) of the first BSS, or timing information indicating a time at which the first management frame is scheduled to be transmitted.

4. The method of claim 1, wherein the MBID includes address information for deriving the address of the first BSS.

5. The method of claim 4, wherein the address information includes a number (N) of least significant bits (LSBs) in which the address of the first BSS differs from the address of the second BSS.

6. The method of claim 4, wherein the address information further includes bit values for one or more LSBs of the first BSS.

7. The method of claim 1, wherein communication frames transmitted for each of the first BSS and the second BSS are associated with the same BSS color.

8. The method of claim 1, further comprising:
transmitting a control frame, from the AP, for the first BSS, wherein the control frame is directed to STAs associated with the first BSS or the at least one BSS other than the first BSS;
receiving a response frame, from at least one of the STAs, in response to the control frame; and
decoding whether the response frame is intended for the first BSS or the at least one BSS other than the first BSS.

9. An access point (AP), comprising:
one or more processors; and
a memory storing instructions that, when executed by the one or more processors, cause the access point to:
generate a first management frame for a first basic service set (BSS) configured to operate in compliance with the IEEE 802.11ax specification, the first management frame including a Multiple BSSID element (MBE), which includes information for establishing or maintaining communications with at least one BSS other than the first BSS, wherein the first BSS provides scheduled access to wireless stations (STAs) associated with the first BSS or the at least one BSS other than the first BSS;
generate a second management frame for a second BSS, the second management frame including information for establishing or maintaining communications with only the second BSS and providing access to STAs associated with the second BSS, including STAs that do not support receiving control frames from the first BSS, and wherein the second management frame does not include an MBE but includes a multi-BSS indicator (MBID) indicating that the AP is configured to transmit management frames including MBEs for a BSS other than the second BSS;
transmit the first management frame for the first BSS;
transmit the second management frame for the second BSS; and
receive a first communication frame from a STA associated with the at least one BSS other than the first BSS, the first communication frame indicating a capability of the STA to decode management or control frames transmitted by the AP for the first BSS.

10. The access point of claim 9, wherein the MBID advertises the AP as a multi-BSS AP.

11. The access point of claim 9, wherein the MBID corresponds to at least one of a single bit value, a BSS identifier (BSSID) of the first BSS, or timing information indicating a time at which the first management frame is scheduled to be transmitted.

12. The access point of claim 9, wherein the MBID includes address information for deriving the address of the first BSS.

13. The access point of claim 12, wherein the address information includes a number (N) of least significant bits (LSBs) in which the address of the first BSS differs from the address of the second BSS.

14. The access point of claim 12, wherein the address information further includes bit values for one or more LSBs of the first BSS.

15. The access point of claim 9, wherein communication frames transmitted for each of the first BSS and the second BSS are associated with the same BSS color.

16. The access point of claim 9, wherein execution of the instructions further cause the AP to:
transmit a control frame for the first BSS, wherein the control frame is directed to STAs associated with the first BSS or the at least one BSS other than the first BSS;
receive a response, from at least one of the STAs, in response to the control frame; and
decode whether the response frame is intended for the first BSS or the at least one BSS other than the first BSS.

17. A method, comprising:
receiving a first management frame, from an access point (AP), for a first basic service set (BSS), wherein the first management frame includes a multi-BSS indicator (MBID) indicating that the AP is configured to transmit management frames including multiple BSSID elements (MBEs) for a BSS other than the first BSS, and wherein the first management frame does not include an MBE;
identifying, based at least in part on the MBID provided in the first management frame, a second BSS configured to operate in compliance with the IEEE 802.11ax specification;
receiving a second management frame, transmitted by the AP for the second BSS, wherein the second management frame includes an MBE including information for establishing or maintaining communications with at least one BSS other than the second BSS;
associating with the at least one BSS other than the second BSS using the information in the MBE; and
while associated with the at least one BSS:
listening for management or control frames, transmitted by the AP, for the at least one BSS;
listening for management or control frames, transmitted by the AP, for the second BSS; and
transmitting a first communication frame to the AP, the first communication frame indicating a capability to decode management or control frames transmitted by the AP for the second BSS.

18. The method of claim 17, wherein the MBID advertises the AP as a multi-BSS AP.

19. The method of claim 17, wherein the MBID corresponds to at least one of a single bit value, a BSS identifier (BSSID) of the second BSS, or timing information indicating a time at which the second management frame is scheduled to be transmitted.

20. The method of claim 17, wherein the MBID includes address information for deriving the address of the second BSS.

21. The method of claim 20, wherein the address information includes a number (N) of least significant bits (LSBs) in which the address of the first BSS differs from the address of the second BSS.

22. The method of claim 20, wherein the address information further includes bit values for one or more LSBs of the second BSS.

23. The method of claim 17, wherein the identifying comprises:
   determining a BSS color associated with the first management frame; and
   searching for management frames transmitted by the second BSS based on the BSS color associated with the first management frame, wherein the first management frame and the second management frame are associated with the same BSS color.

24. A wireless station (STA), comprising:
   one or more processors; and
   a memory storing instructions that, when executed by the one or more processors, cause the STA to:
   receive a first management frame, from an access point (AP), for a first basic service set (BSS), wherein the first management frame includes a multi-BSS indicator (MBID) indicating that the AP is configured to transmit management frames including multiple BSSID elements (MBEs) for a BSS other than the first BSS, and wherein the first management frame does not include an MBE; and
   identify, based at least in part on the MBID provided in the first management frame, a second BSS configured to operate in compliance with the IEEE 802.11ax specification;
   receive a second management frame, transmitted by the AP for the second BSS, wherein the second management frame includes an MBE including information for establishing or maintaining communications with at least one BSS other than the second BSS;
   associate with the at least one BSS other than the second BSS using the information in the MBE; and
   while associated with the at least one BSS:
   listen for management or control frames, transmitted by the AP, for the at least one BSS;
   listen for management or control frames, transmitted by the AP, for the second BSS; and transmit a first communication frame to the AP, the first communication frame indicating a capability to decode management or control frames transmitted by the AP for the second BSS.

25. The wireless station of claim 24, wherein the MBID advertises the AP as a multi-BSS AP.

26. The wireless station of claim 24, wherein the MBID corresponds to at least one of a single bit value, a BSS identifier (BSSID) of the second BSS, or timing information indicating a time at which the second management frame is scheduled to be transmitted.

27. The wireless station of claim 24, wherein the MBID includes address information for deriving the address of the second BSS.

28. The wireless station of claim 27, wherein the address information includes a number (N) of least significant bits (LSBs) in which the address of the first BSS differs from the address of the second BSS.

29. The wireless station of claim 27, wherein the address information further includes bit values for one or more LSBs of the second BSS.

30. The wireless station of claim 24, wherein execution of the instructions for identifying the second BSS causes the STA to:
   determine a BSS color associated with the first management frame; and
   search for management frames transmitted by the second BSS based on the BSS color associated with the first management frame, wherein the first management frame and the second management frame are associated with the same BSS color.

* * * * *